(12) United States Patent
Shin

(10) Patent No.: US 11,656,427 B2
(45) Date of Patent: *May 23, 2023

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventor: Seung Taek Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 188 days.

This patent is subject to a terminal disclaimer.

(21) Appl. No.: 17/153,339

(22) Filed: Jan. 20, 2021

(65) Prior Publication Data

US 2021/0141188 A1    May 13, 2021

Related U.S. Application Data

(63) Continuation of application No. 16/072,783, filed as application No. PCT/KR2017/001014 on Jan. 31, 2017, now Pat. No. 10,928,607.

(30) Foreign Application Priority Data

Feb. 4, 2016  (KR) .................. 10-2016-0013946
Feb. 4, 2016  (KR) .................. 10-2016-0013947

(51) Int. Cl.
*G02B 7/09*    (2021.01)
*G03B 5/00*    (2021.01)
(Continued)

(52) U.S. Cl.
CPC .............. *G02B 7/09* (2013.01); *G02B 7/08* (2013.01); *G02B 27/64* (2013.01); *G02B 27/646* (2013.01);
(Continued)

(58) Field of Classification Search
None
See application file for complete search history.

(56) References Cited

U.S. PATENT DOCUMENTS

| 5,682,097 A | 10/1997 | Bryant et al. |
| 8,390,946 B2 | 3/2013 | Hu et al. |
| 2016/0187668 A1 | 6/2016 | Hayashi |

FOREIGN PATENT DOCUMENTS

| CN | 102565993 A | 7/2012 |
| CN | 103201934 A | 7/2013 |

(Continued)

OTHER PUBLICATIONS

International Search Report dated Apr. 20, 2017 in International Application No. PCT/KR2017/001014.

(Continued)

*Primary Examiner* — Darryl J Collins
*Assistant Examiner* — Tamara Y. Washington
(74) *Attorney, Agent, or Firm* — Saliwanchik, Lloyd & Eisenschenk

(57) ABSTRACT

A lens driving device is provided which includes a housing supporting a magnet; a bobbin having a first coil disposed on the outer peripheral surface thereof and moved by an interaction between the magnet and the first coil; an upper elastic member and a lower elastic member coupled to the bobbin and the housing; and a sensing coil disposed at the housing to be spaced apart from the magnet and generating an induced voltage by an interaction with the first coil, the sensing coil being wound around a side part of the housing so as to rotate in a clockwise direction or in a counterclockwise direction with reference to an optical axis.

20 Claims, 24 Drawing Sheets

(51) Int. Cl.

| | |
|---|---|
| *H02K 33/02* | (2006.01) |
| *H02K 11/225* | (2016.01) |
| *G03B 3/10* | (2021.01) |
| *G02B 7/08* | (2021.01) |
| *H04N 5/232* | (2006.01) |
| *H04N 5/225* | (2006.01) |
| *G02B 27/64* | (2006.01) |
| *G03B 13/36* | (2021.01) |

(52) U.S. Cl.
CPC ............... *G03B 3/10* (2013.01); *G03B 5/00* (2013.01); *G03B 13/36* (2013.01); *H02K 11/225* (2016.01); *H02K 33/02* (2013.01); *H04N 5/2254* (2013.01); *H04N 5/2257* (2013.01); *H04N 5/232* (2013.01); *H04N 5/23258* (2013.01); *H04N 5/23287* (2013.01); *G03B 2205/0007* (2013.01); *G03B 2205/0069* (2013.01)

(56) References Cited

FOREIGN PATENT DOCUMENTS

| CN | 103901702 A | 7/2014 |
|---|---|---|
| CN | 204101866 U | 1/2015 |
| CN | 104902149 A | 9/2015 |
| CN | 104935792 A | 9/2015 |
| CN | 204945591 U | 1/2016 |
| JP | 4-119306 A | 4/1992 |
| JP | 6-230263 A | 8/1994 |
| JP | 2008-191608 A | 8/2008 |
| JP | 2011-112709 A | 6/2011 |
| JP | 2012-027433 A | 2/2012 |
| JP | 2012-177754 A | 9/2012 |
| JP | 2014-126668 A | 7/2014 |
| JP | 2015-191213 A | 11/2015 |
| JP | 2015-197627 A | 11/2015 |
| KR | 10-2009-0122105 A | 11/2009 |
| KR | 10-2013-0055288 A | 5/2013 |
| KR | 10-2015-0089648 A | 8/2015 |
| KR | 10-2016-0008860 A | 1/2016 |
| TW | 201205143 A1 | 2/2012 |

OTHER PUBLICATIONS

Office Action dated Dec. 16, 2019 in Chinese Application No. 201780018014.8.
Office Action dated Apr. 6, 2020 in U.S. Appl. No. 16/072,783.
Notice of Allowance dated Oct. 21, 2020 in U.S. Appl. No. 16/072,783.
Office Action dated Oct. 28, 2022 in Korean Application No. 10-2016-0013947.
Office Action dated Jan. 5, 2023 in Korean Application No. 10-2016-0013946.

LENS DRIVING DEVICE, AND CAMERA MODULE AND OPTICAL DEVICE INCLUDING SAME

CROSS-REFERENCE TO RELATED APPLICATIONS

This application is a continuation of U.S. patent application Ser. No. 16/072,783, filed Jul. 25, 2018; which is the U.S. national stage application of International Patent Application No. PCT/KR2017/001014, filed Jan. 31, 2017; which claims priority to Korean Patent Application Nos. 10-2016-0013946, filed Feb. 4, 2016; and 10-2016-0013947, filed Feb. 4, 2016, the disclosures of each of which are incorporated herein by reference in their entirety.

TECHNICAL FIELD

Embodiments relate to a lens driving device, and a camera module and an optical device including the same.

BACKGROUND ART

It is difficult to apply Voice Coil Motor technology, which is conventionally used in general camera modules, to micro-camera modules for low power consumption and, thus, related research is being vigorously carried out.

Demand for and production of electronic products, such as a smartphone, a mobile terminal provided with a camera mounted therein, etc., is increasing now. A camera for mobile terminals tends to have high resolution and be miniaturized and thereby an actuator tends to be miniaturized and have a large diameter and multiple functions. In order to implement a high resolution camera for mobile terminals, improvement in performance of the camera for mobile terminals and additional functions, such as an auto-focus function, improvement in shake of a shutter and a zoom function, are required.

DISCLOSURE

Technical Problem

Embodiments provide a lens driving device which may inhibit lowering of bonding reliability of a sensing coil, enable easy soldering to bond the sensing coil, implement the sensing coil having a predetermined resistance at a small number of windings and improve electromagnetic force through interaction with magnets, and a camera module and an optical device including the same.

Technical Solution

In one embodiment, a lens driving device includes a housing; a bobbin disposed in the housing so as to mount lenses thereon; a first coil disposed on the bobbin; a magnet disposed on the housing; an upper elastic member and a lower elastic member coupled to the bobbin and the housing; and a sensing coil disposed on the housing so as to be spaced apart from the magnet and generating induced voltage by interaction with the first coil, wherein the sensing coil is disposed on a side portion of the housing so as to be rotated about an optical axis.

The housing may include a plurality of side portions, and the sensing coil may be disposed on outer surfaces of the side portions of the housing.

A receiving groove may be formed on the outer surfaces of the side portions of the housing, and the sensing coil may be wound on the receiving groove.

The housing may include a first stepped part protruding from the outer surface of one of the side portions so as to guide a starting part of the sensing coil; and a second stepped part protruding from the outer surface of another of the side portions so as to guide an ending part of the sensing coil.

The sensing coil may be disposed below the upper elastic member and disposed above the magnet.

At an initial position, the sensing coil may not overlap the magnets in a direction parallel to the optical axis.

At the initial position, the sensing coil may not overlap the magnets in a direction vertical to the optical axis.

At the initial position, the sensing coil may not overlap the first coil in a direction vertical to the optical axis.

A driving signal provided as an AC signal or a pulse signal may be applied to the first coil.

The upper elastic member may be divided into two or more upper elastic members, the first coil may be conductively connected to two selected from the divided upper elastic members, and the sensing coil may be conductively connected to two selected from the remaining upper elastic members excluding the selected two upper elastic members.

The upper elastic member may include first and second upper elastic members which are separated from each other, each of the first and second upper elastic members may include an inner frame connected to the bobbin, an outer frame connected to the housing and a frame connection part connecting the inner frame and the outer frame, the starting part of the sensing coil may be directly bonded to the outer frame of the first upper elastic member, and the ending part of the sensing coil may be directly bonded to the outer frame of the second upper elastic member.

The lens driving device may further include a circuit board located below the lower elastic member; and support members conductively connecting the divided upper elastic members to the circuit board, and the sensing coil may be disposed between the support members and an outer side portion of the housing.

In another embodiment, a lens driving device includes a housing; a bobbin disposed in the housing so as to mount lenses thereon; a first coil disposed on the bobbin; an upper elastic member coupled to the bobbin and the housing; a support member having one end connected to the upper elastic member; and a sensing coil generating induced voltage by interaction with the first coil, wherein the sensing coil is disposed on a side portion of the housing so that the sensing coil is spaced apart from the magnet and at least a part of the sensing coil is located at an outside of the support member, and the outside of the support member is opposite the center of the housing with respect to the support member.

The housing may include first side portions provided with the magnet disposed thereon; and second side portions provided with the support member disposed therein and interconnecting two neighboring first side portions of the first side portions, and the sensing coil may be disposed on outer surfaces of the first side portions and the second side portions.

The sensing coil may include first parts disposed on the outer surfaces of the first side portions; and second parts disposed on the outer surfaces of the second side portions, and each of the second parts may be curved.

Each of the second parts of the sensing coil may be located at the outside of the support member.

A distance from the center of the housing to the support member may be less than a distance from the center of the housing to the second parts of the sensing coil.

The housing may have a receiving groove including first grooves provided on the first side parts and second grooves provided on the second side parts, the sensing coil may be disposed in the receiving groove, a first distance may be greater than a second distance, the first distance may be a distance between a virtual straight line, which passes through the center of the housing and is parallel to the optical axis, and the second grooves, and the second distance may be a distance between the virtual straight line and the through holes.

In accordance with another embodiment, a camera module includes a lens barrel; the lens driving device in accordance with the former embodiment configured to move the lens barrel; and an image sensor converting an image of light incident through the lens driving device into an electrical signal.

In accordance with yet another embodiment, an optical device includes a display module including a plurality of pixels, colors of which are changed according to an electrical signal; the camera module in accordance with the former embodiment configured to convert an image of light incident through lenses into an electrical signal; and a controller controlling operation of the display module and the camera module.

Advantageous Effects

A lens driving device in accordance with one embodiment may inhibit lowering of bonding reliability of a sensing coil, enable easy soldering to bond the sensing coil, implement the sensing coil having a predetermined resistance at a small number of windings and improve electromagnetic force through interaction with magnets.

BEST MODE

Figure 1:
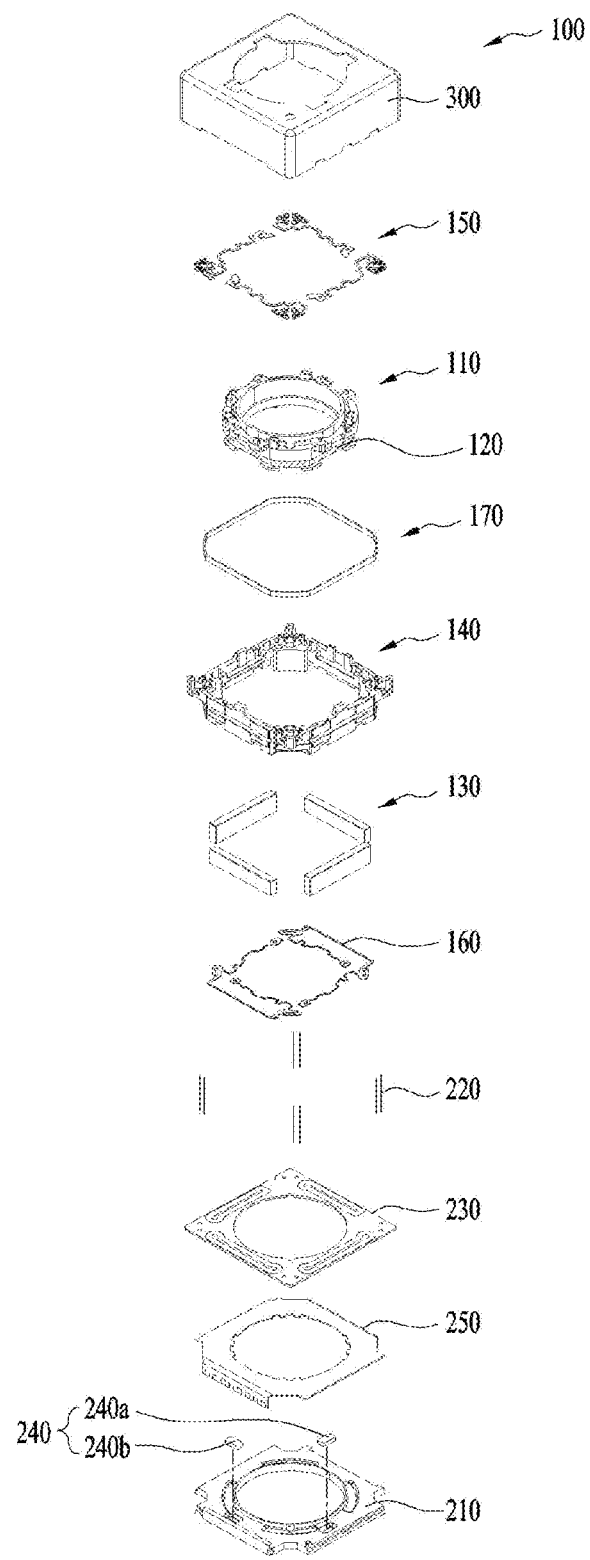
FIG. 1 is an exploded perspective view of a lens driving device shown in FIG. 1.

Hereinafter, embodiments will be described with reference to the annexed drawings and description. In the following description of the embodiments, it will be understood that, when each layer (film), region, pattern or structure is referred to as being formed "on" or "under" a substrate or another layer (film), region, pad or pattern, the former can be directly "on" or "under" the latter or be indirectly formed with one or more intervening layers therebetween. Further, a criterion for the upward direction or the downward direction of each layer is described based on the drawings. In the drawings, the same or similar elements are denoted by the same reference numerals even though they are depicted in different drawings.

Hereinafter, a lens driving device in accordance with embodiments will be described with reference to the accompanying drawings. For convenience of description, although the lens driving device in accordance with the embodiments will be described using a Cartesian coordinate system (x, y, z), the embodiments are not limited thereto and other coordinate systems may be used. In the drawings, the x-axis and the y-axis may mean directions vertical to an optical axis, i.e., the z-axis, the z-axis direction corresponding to the optical axis direction may be referred to as a 'first direction', the x-axis direction may be referred to as a 'second direction', and the y-axis direction may be referred to as a 'third direction'.

A 'handshake correction device' applied to a micro-camera module of a mobile device, such as a smartphone or a tablet PC, may mean a device which is configured to inhibit, when a still image is captured, unclearness of the outline of the captured image due to vibration caused by shaking of a user's hand.

Further, an 'autofocus device' is a device which automatically focuses an image of a subject on an image sensor surface. The handshake correction device and the autofocus device may be variously configured, and the lens driving device in accordance with the embodiments may move an optical module including at least one lens in the first direction parallel to the optical axis or move the optical module with respect to the plane formed by the second direction and the third direction vertical to the first direction and thus perform a handshake correction operation and/or an autofocus operation.

Figure 2:
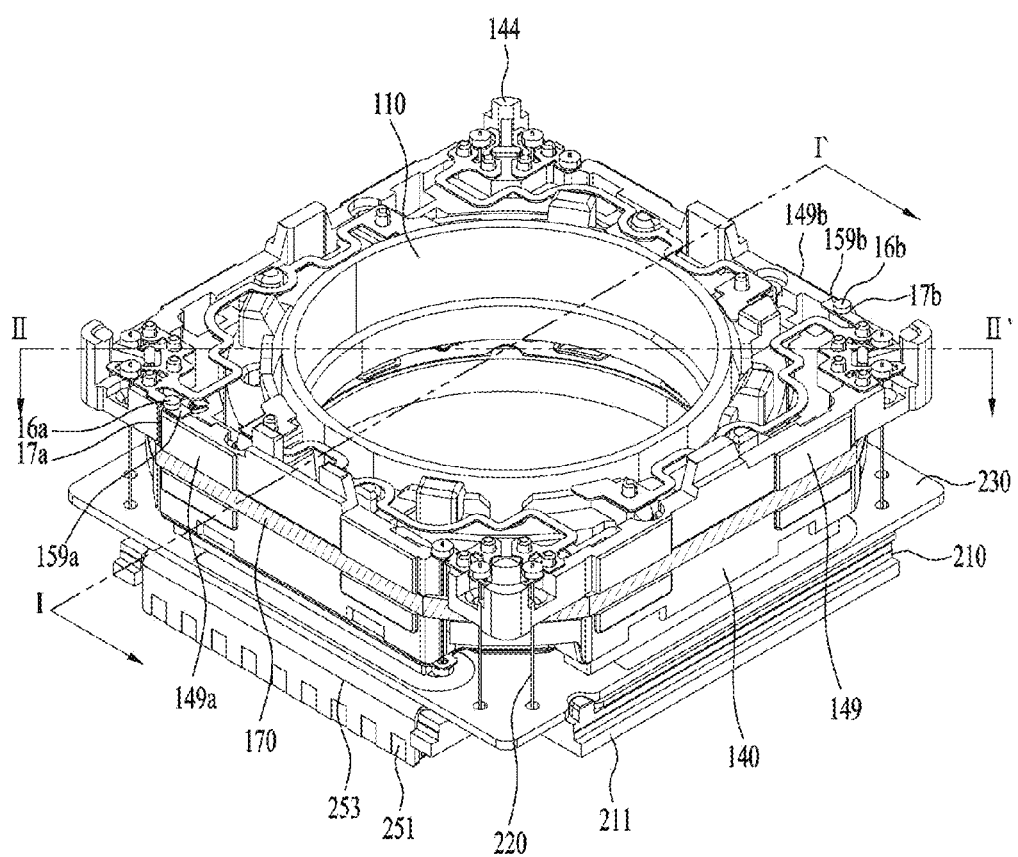
FIG. 2 is a perspective view illustrating an assembled state of the lens driving device of FIG. 1 excluding a cover member.
Figure 3:
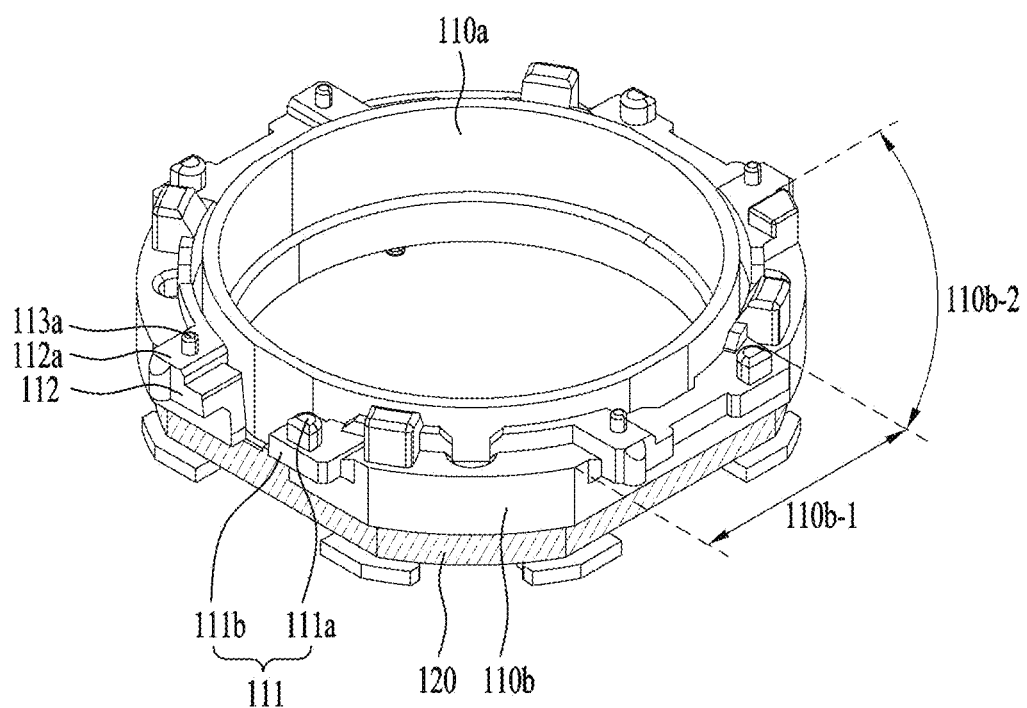
FIG. 3 is a perspective view of a bobbin of FIG. 1.

FIG. 1 is an exploded perspective view of a lens driving device 100 in accordance with one embodiment, FIG. 2 is a perspective view illustrating an assembled state of the lens driving device of FIG. 1 excluding a cover member 300, and FIG. 3 is a perspective view of a bobbin 110 of FIG. 1.

With reference to FIGS. 1 and 2, the lens driving device 100 includes a bobbin 110, a first coil 120, magnets 130, a housing 140, an upper elastic member 150, a lower elastic member 160 and a sensing coil 170.

Further, the lens driving device 100 may further include support members 220, a second coil 230, Optical Image Stabilization (OIS) position sensors 240, and a circuit board 250. Further, the lens driving device 100 may further include a base 210 and the cover member 300.

First, the cover member 300 will be described.

The cover member 300 together with the base 210 forms a receipt space and thus receives the bobbin 110, the first coil 120, the magnets 130, the housing 140, the upper elastic member 150, the lower elastic member 160, the sensing coil 170, the support members 220, the second coil 230, the OIS position sensors 240 and the circuit board 250, in the receipt space.

The cover member 300 may have a box shape having an upper end part, side walls and an open lower part, and the lower part of the cover member 300 may be coupled to an upper part of the base 210. The upper end part of the cover member 300 may have a polygonal shape, for example, a rectangular or octagonal shape.

The cover member 300 may have a hollow formed at the upper end part thereof so as to expose lenses (not shown) coupled to the bobbin 110 to external light. Further, in order to inhibit foreign substances, such as dust, moisture, etc., from infiltrating into a camera module, a window formed of a light-transmitting material may be additionally provided in the hollow of the cover member 300.

Although the cover member 300 may be formed of a non-magnetic material, such as SUS, so as to inhibit attraction to the magnets 130, the cover member 300 may be formed of a magnetic material and thus function as a yoke.

Next, the bobbin 110 will be described.

The bobbin 110 is located within the housing 140 and is movable in the optical axis direction or in the first direction parallel to the optical axis direction (for example, in the z-axis direction or the optical axis direction) by electromagnetic interaction between the coil 120 and the magnets 130.

The bobbin 110 may include a lens barrel (not shown) including at least one lens installed therein, and the lens barrel may be coupled to the inside of the bobbin 110 by various methods.

The bobbin 110 may have a hollow to mount the at least one lens or the lens barrel therein. The shape of the hollow of the bobbin 110 may be the same as the shape of the at least one lens or the lens barrel mounted therein and, for example, be a circular, oval or polygonal shape, without being limited thereto. An outer circumferential surface 110b of the bobbin 110 may include first side surfaces 110b-1 corresponding to or being opposite to first side parts 141 of the housing 140 on which the magnets 130 are disposed, and second side surfaces 110b-2 disposed between the first side surfaces 110b-1 and interconnecting the first side surfaces 110b-1.

The bobbin 110 may include first and second protrusions 111 and 112 on the outer circumferential surface 110b thereof.

The first protrusion 111 of the bobbin 110 may include a guide part 111a and a first stopper 111b. The guide part 111a of the bobbin 110 may serve to guide an installation position of a frame connection part of the upper elastic member 150.

The second protrusion 112 of the bobbin 110 may protrude from the outer circumferential surface 110b of the bobbin 110 in the second and third directions perpendicular to the first direction. Further, a coupling protrusion 113a coupled to an inner frame 151 of the upper elastic member 150 may be provided on an upper surface 112a of the second protrusion 112 of the bobbin 110. Further, the bobbin 110 may have at least one coupling protrusion disposed on a lower surface thereof and coupled and fixed to an inner frame 161 of the lower elastic member 160.

The bobbin 110 may have at least one groove (not shown), in which the first coil 120 is disposed or installed, formed on the outer circumferential surface thereof. The first coil 120 may be disposed or received in the groove, or the first coil 120 may be directly wound on the groove. The shape and the number of the at least one groove may correspond to the shape and the number of coils disposed on the outer circumferential surface of the bobbin 110. In accordance with another embodiment, the bobbin 110 may have no coil receiving groove and the first coil 120 may be directly wound on the outer circumferential surface of the bobbin 110.

Next, the first coil 120 will be described.

The first coil 120 is disposed on the outer circumferential surface of the bobbin 110, and the first coil 120 may be a driving coil which electromagnetically interacts with the magnets 130 disposed on the housing 140. In order to generate electromagnetic force due to electromagnetic interaction with the magnets 130, a driving signal (for example, a driving current) may be applied to the first coil 120.

An AutoFocus (AF) moveable unit may be moved in the first direction by electromagnetic force due to electromagnetic interaction between the first coil 120 and the magnets 130. The movement of the AF moveable unit in the first direction may be controlled by adjusting electromagnetic force by controlling a driving signal applied to the first coil 120 and, thereby, an autofocus function may be performed.

The AF moveable unit may include the bobbin 110 elastically supported by the upper and lower elastic members 150 and 160, and elements mounted on the bobbin 110 and moved together with the bobbin 110. For example, the AF moveable unit may include the bobbin 110, the first coil 120 and the lens (not shown) mounted on the bobbin 110.

The first coil 120 may be wound on the outer circumferential surface of the bobbin 110 so as to be rotated in the clockwise direction or the counterclockwise direction about the optical axis. In accordance with another embodiment, the first coil 120 may be implemented as coil rings wound in the clockwise direction or the counterclockwise direction about an axis vertical to the optical axis, and the number of the coil rings may be the same as the number of the magnets 130, without being limited thereto.

The first coil 120 may be conductively connected to at least one of the upper elastic member 150 or the lower elastic member 160 so as to receive a driving signal.

Next, the housing 140 will be described.

The housing 140 may support the magnets 130 and the sensing coil 170, and receive the bobbin 110 therein so as to move the bobbin 110 in the first direction by electromotive force caused by electromagnetic interaction between the first coil 120 and the magnets 130.

Figure 4:
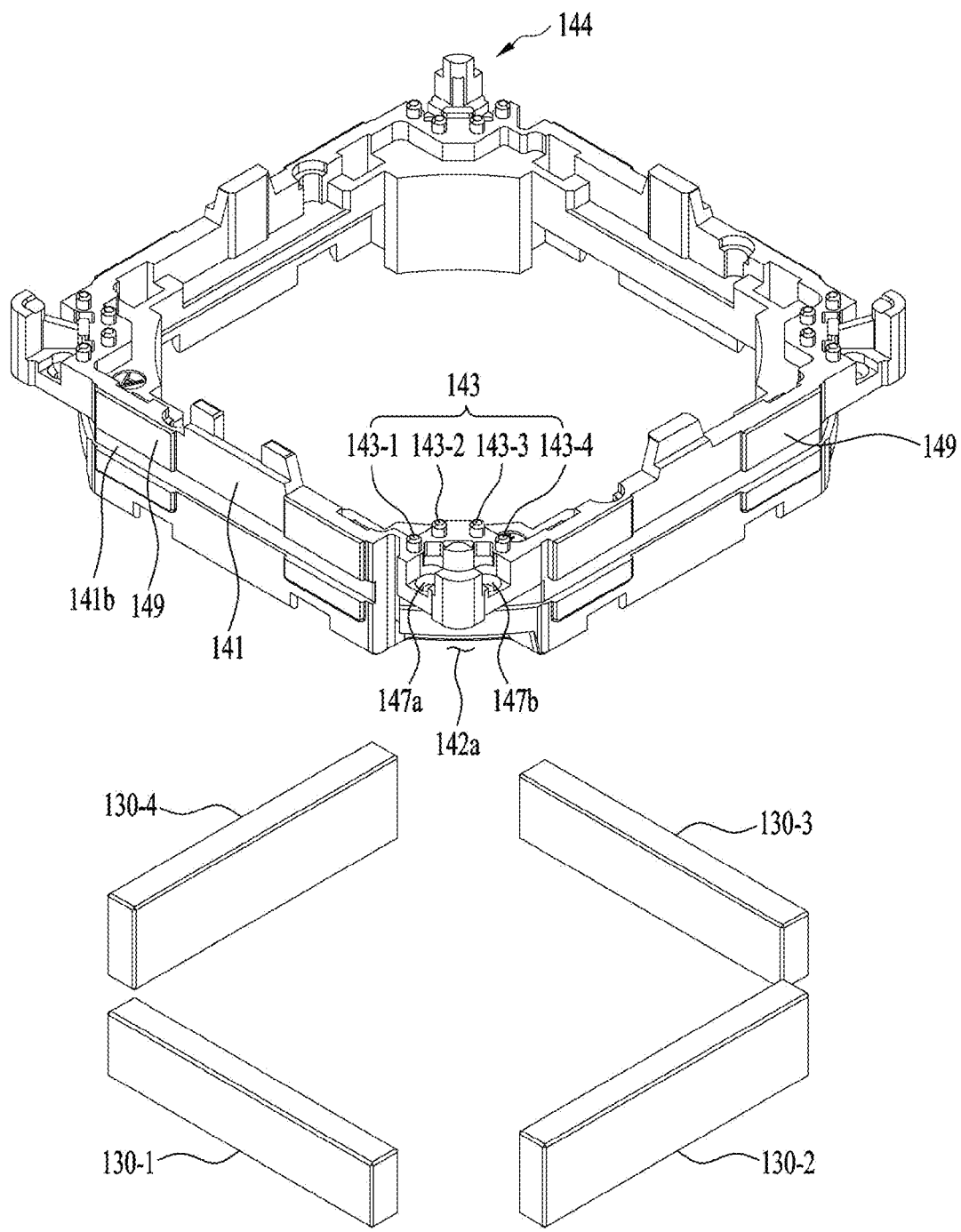
FIG. 4 is a first exploded perspective view illustrating a housing and magnets shown in FIG. 1.
Figure 5:
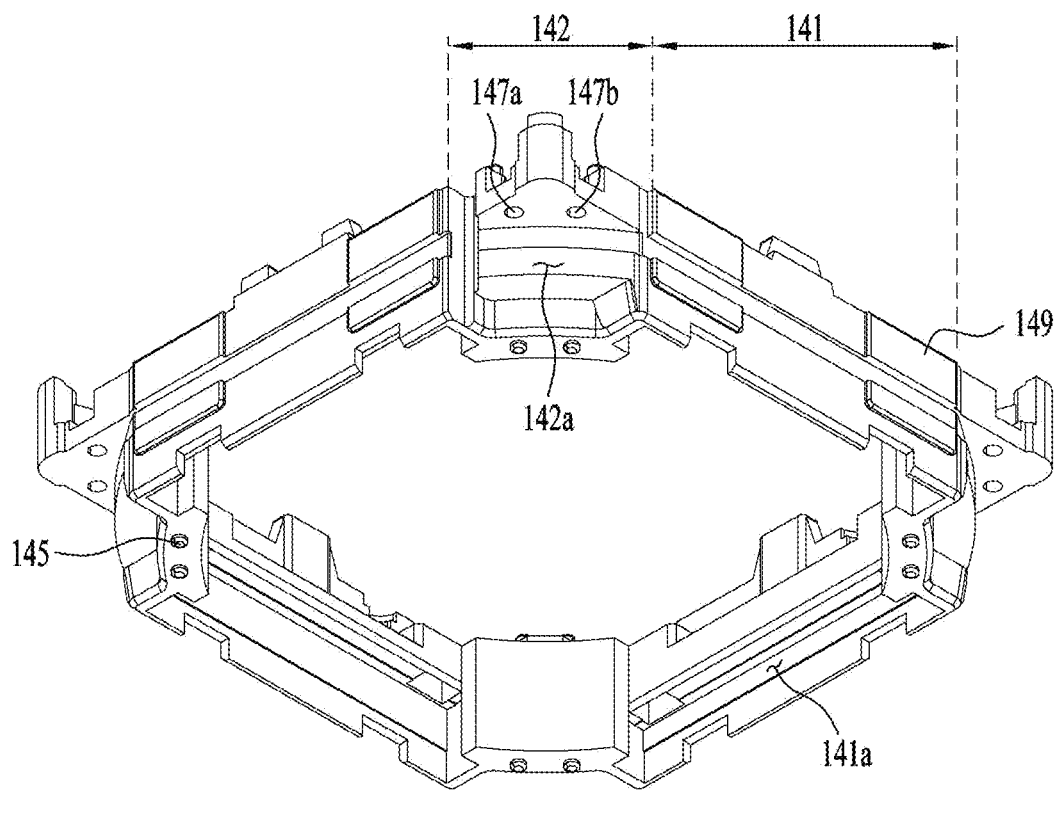
FIG. 5 is a second exploded perspective view illustrating the housing and the magnets shown in FIG. 1.
Figure 5:
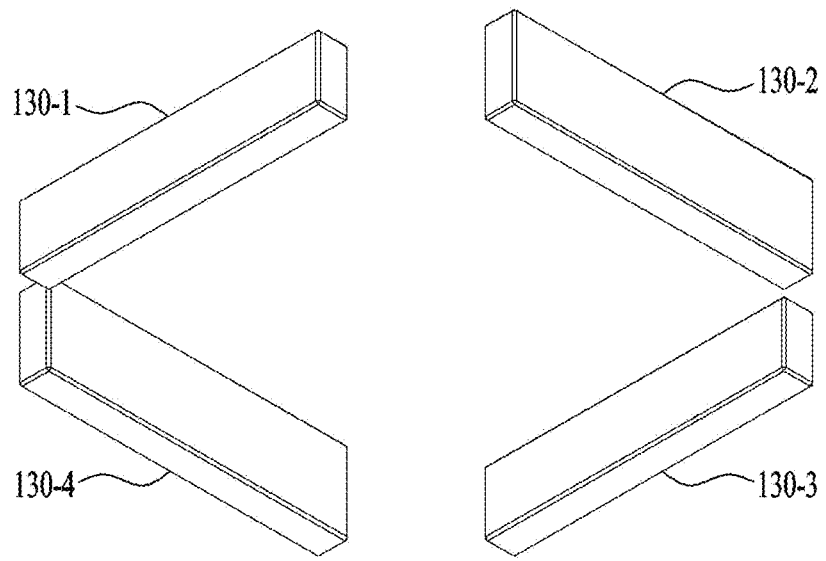

FIG. 4 is a first exploded perspective view illustrating the housing 140 and the magnets 130 shown in FIG. 1, and FIG. 5 is a second exploded perspective view illustrating the housing 140 and the magnets 130 shown in FIG. 1.

With reference to FIGS. 4 and 5, the housing 140 may generally have a hollow pillar shape. For example, the housing 140 may have a polygonal (for example, rectangular or octagonal) or circular hollow.

The housing 140 may include a plurality of side parts 141 and 142. For example, the housing 140 may include four first side parts 141 and four second side parts 142, and the width of each of the first side parts 141 may be greater than the width of each of the second side parts 142.

The first side parts 141 of the housing 140 may correspond to parts of the housing 140 on which the magnets 130 are installed. Each of the second side parts 142 of the housing 140 may be located between two neighboring first side parts and correspond to parts of the housing 140 in which the support members 220 are disposed.

For example, the first side parts 141 may correspond to sides of the housing 140, and the second side parts 142 may correspond to corners of the housing 140.

The first side parts 141 of the housing 140 may interconnect the second side parts 142 of the housing 140, and include a flat surface having a designated depth. Each of the first side parts 141 of the housing 140 may have an area which is the same as or greater than the area of the corresponding magnet 130.

The housing 140 may have magnet receiving parts 141a to receive the magnets 130. The magnet receiving part 141 may be provided at the lower end of the inner surface of at least one of the first side parts 141 of the housing 140. For example, the magnet receiving part 141a may be provided at the lower end of the inner surface of each of the four first side parts 141, and each of the magnets 130 may be inserted into or fixed to the corresponding one of the magnet receiving parts 141a.

The magnet receiving parts 141a of the housing 140 may be formed as recesses having a size corresponding to the size of the magnets 130. Openings may be formed on the bottom surfaces of the magnet receiving parts 141a of the housing 140 opposite to the second coil 240, and bottom surfaces of the magnets 130 fixed to the magnet receiving parts 141a may be opposite to the second coil 230.

The first side parts 141 of the housing 140 may be disposed in parallel to the side surfaces of the cover member 300. Further, the area of the first side parts 141 of the housing 140 may be greater than the area of the second side parts 142.

The second side parts 142 of the housing 140 may have through holes 147; 147a and 147b forming paths through which the support members 220 pass. For example, the housing 140 may include the through holes 147 passing through upper portions of the second side parts 142. The number of the through holes 147 may be the same as the number of the support members.

Further, in order to inhibit direct collision with the inner surface of the cover member 300, stoppers 144 may be provided at the upper end or on the upper surface of the housing 140.

The housing 140 may have at least one upper support protrusion 143; 143-1 to 143-4 coupled to an outer frame 152 of the upper elastic member 150 and formed at the upper end or on the upper surface of the housing 140.

For example, the upper support protrusions 143 of the housing 140 may be formed on the upper surface of at least one of the first side parts 141 or the second side parts 142 of the housing 140. For example, the upper support protrusions 143 of the housing 140 may be disposed adjacent to the respective corners of the upper surface of the housing 140. The housing 140 may have lower support protrusions 145 formed on the lower surface thereof so as to be coupled and fixed to an outer frame 162 of the lower elastic members 160.

In order to secure a space filled with gel-type silicone serving as a damper as well as to form the paths through which the support members 220 pass, the housing 140 may have recesses 142a formed on the second side parts 142. That is, the recesses 142a of the housing 140 may be filled with damping silicone.

The housing 140 may have at least one stopper 149 protruding from the outer surface of the first side part 141. In order to inhibit collision of the housing 140 with the cover member 300 when the housing 140 is moved in the second and/or third direction, the stoppers 149 may protrude from the first side parts 141 in the second or third direction.

In order to inhibit collision of the bottom surface of the housing 140 with the base 210 and/or the circuit board 250, which will be described later, the housing 140 may further include stoppers (not shown) protruding from the lower surface thereof, the housing 140 may be spaced apart from the base 210 located below the housing 140 and the cover member 300 located above the housing 140 by the stoppers formed on the upper and lower surfaces of the housing 140 and thus maintain a length in the optical axis direction without upper and lower interference. Therefore, the housing 140 may perform shifting operation in the second and third directions, i.e., the forward and backward directions and the leftward and rightward directions, in the plane vertical to the optical axis.

The housing 140 may include a sensing coil receiving groove 141b to wind or receive the sensing coil 170 thereon or therein. The sensing coil receiving groove 141b of the housing 140 may be formed as a recess on the outer surface of at least one of the first side parts 141 or the second side parts 142 of the housing 140, and be extended from one end to the other end of each of the first side parts 141 and/or the second side parts 142.

In order to wind the sensing coil 170 on the side parts of the housing 140, the depth of the sensing coil receiving groove 141b may be greater than or the same as the thickness of the sensing coil wound on the side parts of the housing 140.

The sensing coil receiving groove 141b may be located below the upper end of the housing 140 and be located above the magnet receiving parts 141a in which the magnets 130 are received. For example, the sensing coil receiving groove 141b may not overlap the magnet receiving parts 141a in the first direction and may not overlap the magnet receiving parts 141a in a direction vertical to the first direction, without being limited thereto. In accordance with another embodiment, the sensing coil receiving groove 141b may overlap the magnet receiving parts 141a in the first direction.

Next, the magnets 130 will be described.

The magnets 130 may be disposed on the housing 140 so that at least a part of the magnets 130 overlap the first coil 120 in a direction vertical to the optical axis. For example, the magnets 130 may be inserted into or disposed in the receiving parts 141a of the housing 140.

The magnets 130 may be disposed so as to be spaced apart from the sensing coil 170 mounted on the housing 140, and a part of the housing 140 may be disposed between the sensing coil and the magnets 130.

For example, the magnets 130 may be disposed below the sensing coil 170.

In order to reduce interference between the magnets 130 and the sensing coil 170, the magnets 130 and the sensing coil 170 may be disposed so as not to overlap each other in the first direction at an initial position, without being limited thereto, and, in accordance with another embodiment, the magnets 130 and the sensing coil 170 may overlap each other in the first direction at the initial position.

For example, the sensing coil 170 may be disposed on the outer surfaces of the first and second side parts 141 and 142 of the housing 140, and the magnets 130 may be disposed on the inner surfaces of the first side parts 141 of the housing 140.

In accordance with another embodiment, the magnets 130 may be disposed on the outer surfaces of the first side parts 141 of the housing 140 so as to be spaced apart from the sensing coil 170.

Further, in accordance with another embodiment, the magnets 130 may be disposed on the inner surfaces of the second side parts 142 of the housing 140 or be disposed on the outer surfaces of the second side parts 142 so as to be spaced apart from the sensing coil 170.

The magnets 130 may have a shape corresponding to the shape of the first side parts 141 of the housing 140, for example, a rectangular parallelepiped shape, without being limited thereto.

The magnet 130 may be formed as one body and be disposed such that one surface of the magnet 130 opposite to the first coil 120 forms the S pole and the other surface of the magnet 130 forms the N pole. However, the disclosure is not limited thereto, and vise versa.

At least two magnets 130 may be installed so as to be opposite to each other. For example, two pairs of magnets 130, which are opposite to each other so as to intersect each other, may be disposed on the housing 140. Here, the magnets 130 may have an approximately rectangular cross-section or, differently, have a triangular or rhomboid cross-section.

For example, the magnet 130 may be disposed on each of two first side parts being opposite to each other, out of the first side parts 141 of the housing 140.

Next, the upper elastic member 150, the lower elastic member 160 and the support members 220 will be described.

The upper elastic member 150 and the lower elastic member 160 elastically support the bobbin 110. The upper elastic member 150 is connected to the upper portion of the bobbin 110 and the upper portion of the housing 140 and thus supports the upper portion of the bobbin 110 and the upper portion of the housing 140.

The lower elastic member 160 is connected to the lower portion of the bobbin 110 and the lower portion of the housing 140 and thus supports the lower portion of the bobbin 110 and the lower portion of the housing 140.

The support members 220 may support the housing 140 so as to be movable with respect to the base 210 in a direction vertical to the optical axis, and conductively connect at least one of the upper or lower elastic member 150 or 160 to the circuit board 250. For example, the support members 220 may conductively connect the upper elastic member 150 to the circuit board 250.

Figure 6:
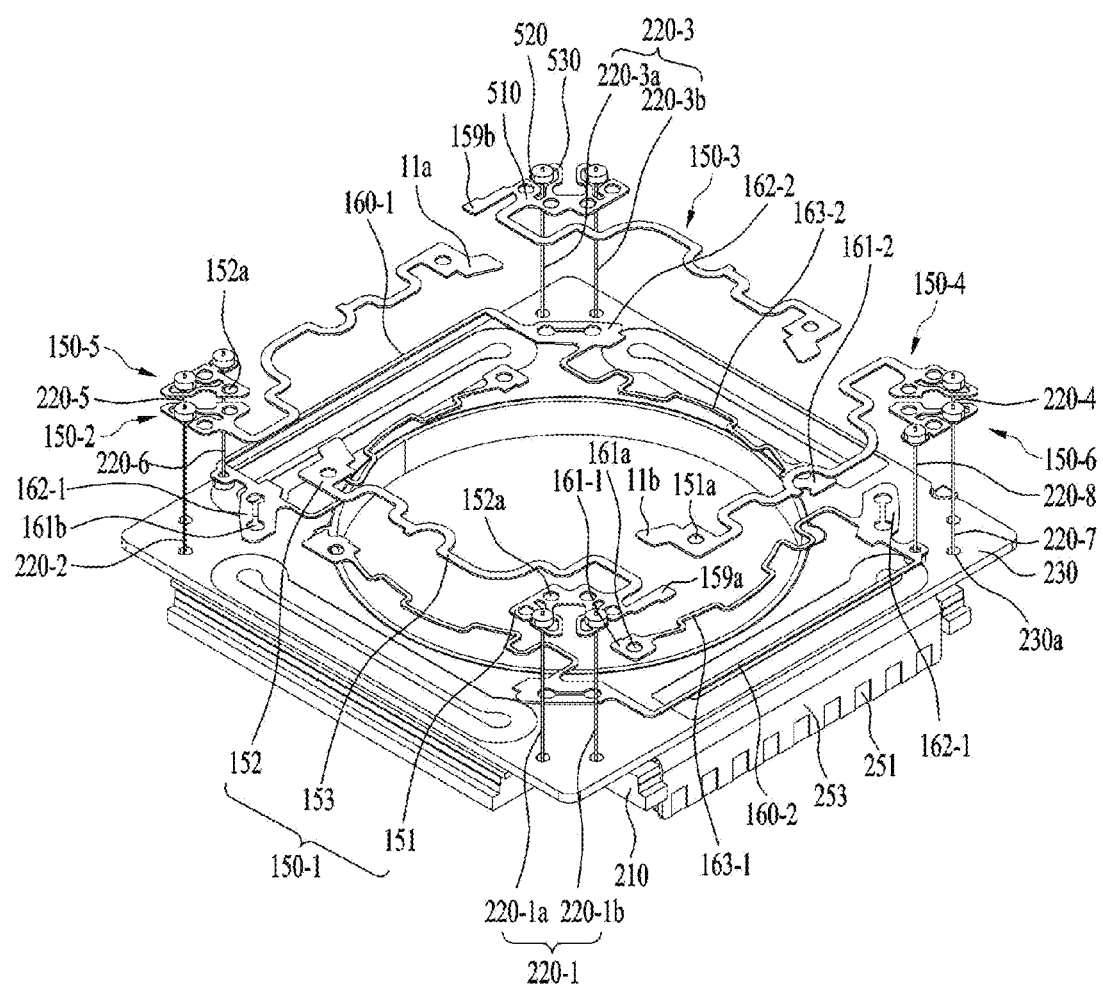
FIG. 6 is a perspective view illustrating an assembled state of an upper elastic member, a lower elastic member, a base, support members and a circuit board shown in FIG. 1.

FIG. 6 is a perspective view illustrating an assembled state of the upper elastic member 150, the lower elastic member 160, the base 210, the support members 220 and the circuit board 250 shown in FIG. 1.

With reference to FIG. 6, the upper elastic member 150 may be divided into two or more upper elastic members. For example, the upper elastic member 150 may include a plurality of upper elastic members 150-1 to 150-6 which are electrically separated from one another and are spaced apart from one another.

For example, the upper elastic members 150-1 to 150-6 may be disposed so as to be symmetrical about the center of the bobbin 110 in the x-y plane, i.e., to form point symmetry. Here, point symmetry means symmetry in which, when two shapes are rotated 180° about a center of rotation, the two shapes exactly overlap each other.

At least one of the upper elastic members 150-1 to 150-6 may be conductively connected to at least corresponding one of the support members 220.

Each of the first to fourth upper elastic members 150-1 to 150-4 may include an inner frame 151 connected to the bobbin 110, an outer frame 152 connected to the housing 140, and a frame connection part 153 connecting the inner frame 151 and the outer frame 152.

Each of the fifth and sixth elastic members 150-5 and 150-6 may be coupled to the housing 140 and be conductively connected to the support members 220-5 to 220-8.

The fifth and sixth elastic members 150-5 and 150-6 are not coupled to the bobbin 110 and may be coupled only to the housing 140 and flexibly support the housing 140.

For example, each of the fifth and sixth elastic members 150-5 and 150-6 may include an outer frame 152 coupled to the housing 140.

For example, a through hole 151a coupled to the upper coupling protrusion 113 of the bobbin 110 may be formed through the inner frame 151 of each of the first to fourth upper elastic members 150-1 to 150-4, and through holes 152a coupled to the upper support protrusions 143 of the housing 140 may be formed through the outer frame 152 of each of the first to sixth elastic members 150-1 to 150-6. For example, the through holes 152a of the outer frames 152 and the upper support protrusions 143 of the housing 140 may be adhered or fixed to each other by an adhesive member, such as silicone.

The inner frames of two upper elastic members selected from the first to fourth upper elastic members 150-1 to 150-4 may be conductively connected to both ends of the first coil 120.

Further, the outer frames of the other two upper elastic members selected from the first to fourth upper elastic members 150-1 to 150-4 may be conductively connected to both ends of the sensing coil 170.

For example, one end of the first coil 120 may be conductively connected to one end 11a of the inner frame 152 of the second upper elastic member 150-2, and the other end of the first coil 120 may conductively connected to one end 11b of the inner frame 152 of the fourth elastic upper member 150-4.

For example, one end 17a of the sensing coil 170 may be directly bonded to one end 159a of the outer frame 151 of the first upper elastic member 150-1 and the other end 17b of the sensing coil 170 may be directly bonded to one end 159*b* of the outer frame 151 of the third upper elastic member 150-3 through solders 16*a* and 16*b*.

Figure 10:
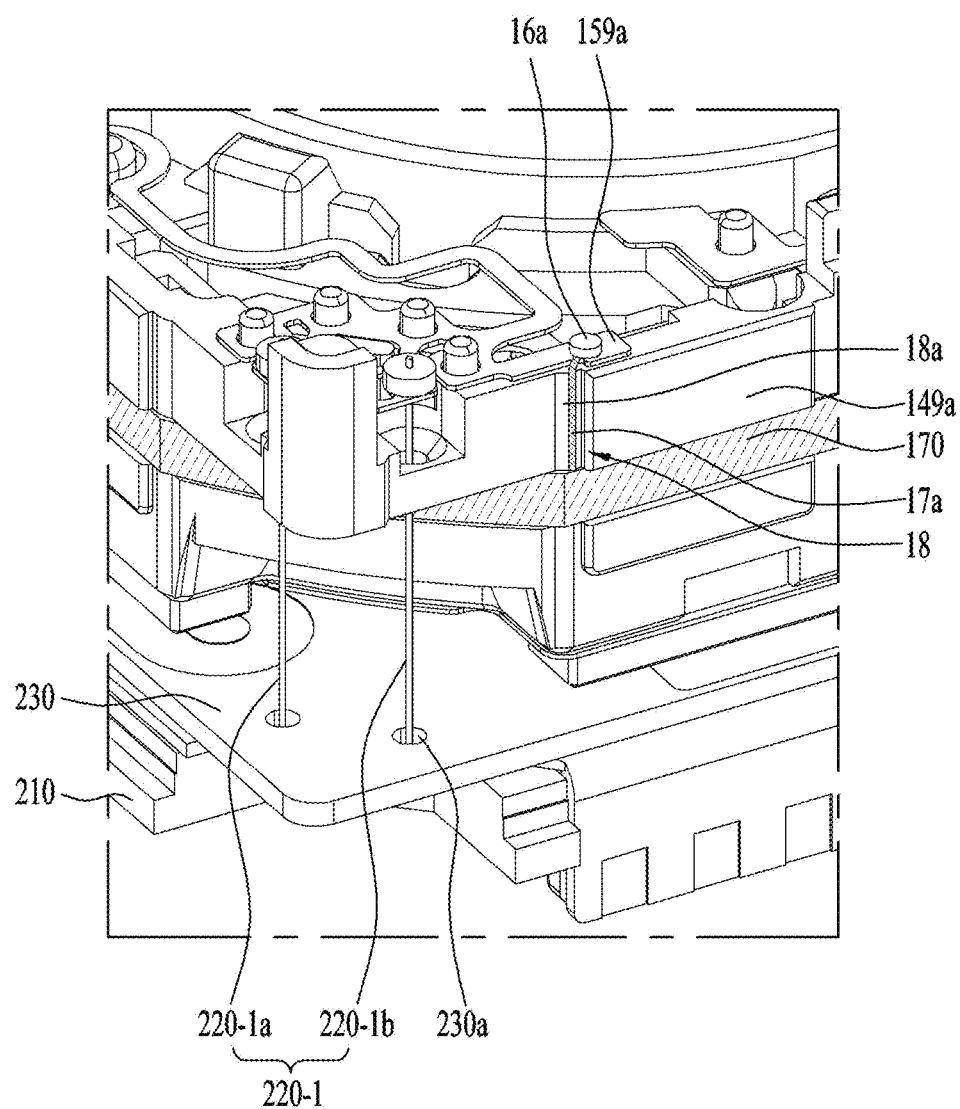
FIG. 10 is an enlarged view of a sensing coil guide part in accordance with one embodiment.

For example, the end 159*a* of the outer frame 151 of the first upper elastic member 150-1 may be extended from a first coupling part 510 of the outer frame 152 of the first upper elastic member 150-1, provided with the through holes 152*a*, towards a starting part 17*a* of the sensing coil 170 (with reference to FIG. 10).

Further, for example, the end 159*b* of the outer frame 151 of the third upper elastic members 150-3 may be extended from a first coupling part 510 of the outer frame 152 of the third upper elastic member 150-3, provided with the through holes 152*a*, towards an ending part 17*b* of the sensing coil 170.

Further, for example, the outer frame 152 of each of the first to fourth upper elastic members 150-1 to 150-4 may be connected to at least one of the support members 220-1 to 220-4. For example, each of the outer frames 152 of the first to fourth upper elastic members 150-1 to 150-4 may be connected to the corresponding one of the support members 220-1 to 220-4.

The frame connection parts 153 may be bent at least once, thus forming a pattern of a designated shape. The ascending and/or descending operation of the bobbin 110 in the first direction parallel to the optical axis may be flexibly supported through positional change and fine deformation of the frame connection parts 153.

The outer frame 152 of each of the first to sixth upper elastic members 150-1 to 150-6 may include the first coupling part 510 coupled to the housing 140, a second coupling part 520 coupled to the corresponding support member, and a connection part 530 connecting the first coupling part 510 and the second coupling part 520. The through holes 152*a* coupled to the upper support protrusions 143 of the housing 140 may be provided at the first coupling part 510 of the outer frame 152 of each of the first to sixth upper elastic members 150-1 to 150-6.

The respective support members 220-1 to 220-8 may be conductively connected to the second coupling parts 520 of the outer frames 152 of the upper elastic members 150-1 to 150-6.

At least one of the first to sixth upper elastic members 150-1 to 150-6 may be conductively connected to the circuit board 250 through at least one of the support members 220-1 to 220-8.

For example, conductive connection between the first coil 120 and the upper elastic members 150-2 and 150-4, between the sensing coil 170 and the upper elastic members 150-1 and 150-3, and between the upper elastic members 150-1 to 150-4 and the support members 220-1 to 220-4 may be carried out by soldering or a conductive adhesive member (for example, conductive epoxy).

The connection part 530 may have a straight shape or a shape which is bent at least once, and the width of the connection part 530 may be less than the width of the frame connection part 153 of the upper elastic member 150. Since the width of the connection part 530 is less than the width of the frame connection part 153 of the upper elastic member 150, the connection part 530 may be easily moved in the optical axis direction or in the first direction parallel to the optical axis and thereby distribute stress applied to the upper elastic member 150 and stress applied to the support members 220.

The lower elastic member 160 may include the inner frame 161 coupled to the lower coupling protrusion of the bobbin 110, an outer frame 162 coupled to the lower support protrusions of the housing 140, and a frame connection part 163 connecting the inner frame 161 and the outer frame 162.

The lower elastic members 160 may include first and second lower elastic members 160-1 and 160-2 which are electrically separated from each other.

Each of the first and second lower elastic members 160-1 and 160-2 may include at least one inner frame 161-1 or 161-2, at least one outer frame 162-1 or 162-2, and at least one frame connection part 163-1 or 163-2. FIG. 6 illustrates the lower elastic member 160 as being divided into a plurality of lower elastic members but, in accordance with another embodiment, the lower elastic member 160 may not be divided.

Next, the sensing coil 170 will be described.

The sensing coil 170 is disposed on the side portion of the housing 140, for example, on the outer surfaces of the side parts 141 and 142 of the housing 140.

For example, the sensing coil 170 may be directly wound on the sensing coil receiving groove 141*b* provided on the first and second side parts 141 and 142 of the housing 140 so as to be rotated in the clockwise direction or in the counterclockwise direction about the optical axis. For example, the sensing coil 170 may be formed in a ring shape so as to be directly wound on the housing 140.

If the sensing coil is implemented as a coil block and then bonded to the upper end of the housing 140, manual work to receive and bond the sensing coil in and to the housing is required. In this case, it is not easy to implement a block of the sensing coil satisfying the shape of the upper surface of the housing, and the sensing coil is bonded to the housing through manual work and thus reliability in bonding between the sensing coil and the housing may be lowered. Further, since the sensing coil is disposed at the upper end of the housing adjacent to the upper elastic members, installation of the upper elastic members may be limited and bonding and soldering with the upper elastic members are not easy.

In accordance with the embodiment, the sensing coil 170 is directly wound on the sensing coil receiving groove 141*b* provided in intermediate regions of the first and second side parts 141 and 142 of the housing 140, manual work to receive or bond the sensing coil 170 in or to the upper end of the housing 140 is not necessary and, thus, lowering of reliability in bonding between the sensing coil 170 and the housing 140 and between the sensing coil 170 and the upper elastic member 150 may be inhibited.

Further, since the sensing coil 170 is disposed below the upper elastic member 150 so as to be spaced apart from the upper elastic member 150, there is no spatial limit in installing the upper elastic member 150 at the upper end of the housing 140.

Further, since the sensing coil 170 is disposed such that each of the starting part and the ending part of the sensing coil 170 contacts one region of the first side parts 141 or the second side parts 142 of the housing 140 and is bonded to one region of the outer frame 152 of the upper elastic member 150 through soldering, soldering operation in the embodiment may be easily performed.

A sensing coil guide part to guide the starting part 17*a* and the ending part 17*b* of the sensing coil 170 may be provided on at least one of the first side parts 141 of the housing 140 adjacent to the upper elastic members (for example, 150-1 and 150-3) to which the starting part 17*a* and the ending part 17*b* of the sensing coil 170 are bonded.

FIG. 10 is an enlarged view of a sensing coil guide part in accordance with one embodiment.

With reference to FIG. 10, the housing 140 may have a first stepped part 149a protruding from the outer surface of one first side part 141 and a second stepped part 149b (with reference to FIG. 2) protruding from the outer surface of another first side part 141. Each of the first stepped part 149a and the second stepped part 149b may be located adjacent to the sensing coil receiving groove 141b. For example, the first stepped part 149a and the second stepped part 149b may be provided on the first side parts of the housing 140 which are opposite to each other.

The first stepped part 149a may guide the starting part 17a of the sensing coil 170, and the second stepped part 149b may guide the ending part 17b of the sensing coil 170.

Each of the first and second stepped parts 149a and 149b may be any one of the stoppers 149, without being limited thereto and, in accordance with another embodiment, the first and second stepped parts 149a and 149b may be provided separately from the stoppers 149.

For example, in order to directly wind the sensing coil 170 on the housing 140, the first and second stepped parts 149a and 149b may be located adjacent to the sensing coil receiving groove 141b, and be located respectively on and under the sensing coil receiving groove 141b.

Since the first and second stepped parts 149a and 149b protrude from the outer surfaces of the first side parts 141 of the housing 140, there is a staircase between the outer surfaces of the first side parts 141 of the housing 140 and the upper surfaces of the first and second stepped parts 149a and 149b and, thus, the side surfaces of the first and second stepped parts 149a and 149b may form staircase surfaces.

The staircase surfaces of the first and second stepped parts 149a and 149b located on and under the sensing coil receiving groove 141b may serve as guide parts to guide the starting part 17a and the ending part 17b of the sensing coil 170, when the sensing coil 170 is directly wound on the housing 140.

For example, a sensing coil guide part 18a may be formed as a protrusion protruding from the outer surface of the first side part 141 adjacent to the staircase surface of each of the first and second stepped parts 149a and 149b, and a groove 18, in which each of the starting part 17a and the ending part 17b of the sensing coil 170 is received, may be formed between the sensing coil guide part 18a and the staircase surface of each of the first and second stepped parts 149a and 149b.

Further, in accordance with another embodiment, the sensing coil guide part may be a groove provided on the first side part 141 of the housing 140. For example, the sensing coil guide part may be a groove formed at the interface between the outer surface of the first side part 141 of the housing 140 and the staircase surface of each of the first and second stepped parts 149a and 149b.

The sensing coil guide parts 18a may serve to inhibit the starting part 17a and the ending part 17b of the sensing coil 170 from being separated from the housing 140 and to inhibit movement of the sensing coil 120 when the upper elastic member 150 is bonded to the housing and, thereby, the sensing coil 170 may be stably directly wound on the side portion of the housing 140.

A driving signal applied to the first coil 120 may be an AC signal, for example, a sinusoidal signal or a pulse signal (for example, a Pulse Width Modulation (PWM) signal). Further, in accordance with another embodiment, a driving signal applied to the first coil 120 may include an AC signal and a DC signal. Application of an AC signal to the first coil 120 serves to induce electromotive force or voltage in the sensing coil 170 due to mutual induction.

The first coil 120 together with the bobbin 110 may be moved in the first direction by electromagnetic force caused by electromagnetic interaction between current flowing in the first coil 120 and the magnets 130 by the driving signal.

As the first coil 120 is moved in the first direction, a distance between the first coil 120 and the sensing coil 170 is changed, and induced voltage may be generated in the sensing coil 170 according to such distance change. For example, as the distance is decreased, induced voltage generated in the sensing coil 170 may be increased and, on the other hand, as the distance is increased, induced voltage generated in the sensing coil 170 may be decreased.

Displacements of the first coil 120 and the bobbin 110 may be sensed based on the induced voltage generated in the sensing coil 170, and the displacement of the bobbin 110 or the driving signal applied to the first coil 120 may be fed back based on the sensed displacements.

The sensing coil 170 may be disposed below the upper elastic member 150 disposed on the upper surface of the housing 140, and be disposed above the magnets 130 disposed on the housing 140.

Next, the support members 220 will be described.

The support members 220 may include a plurality of support members 220-1 to 220-8, and the support members 220-1 to 220-8 may be disposed so as to correspond to the second side parts 142 of the housing 140. For example, each of the support members 220-1 to 220-8 may be disposed adjacent to the corresponding one of the four second side parts 142, and one end of the support member 220 may be bonded to the outer frame 152 of the upper elastic member 150 disposed at the corresponding second side part. Otherwise, in accordance with another embodiment, the support member 220 may be disposed as a leaf spring provided at the first side part 141 of the housing 140.

The support members 220-1 to 220-8 may form paths to transmit a driving signal from the circuit board 250 to the first coil 120, and form paths to transmit induced voltage output from the sensing coil 170 to the circuit board 250.

The support members 220-1 to 220-8 may be implemented as support members using elasticity, for example, leaf springs, coil springs, suspension wires, etc. Further, in accordance with another embodiment, the support members 220 may be formed integrally with the upper elastic members.

The support members 220-1 to 220-8 may be spaced apart from the housing 140, and the support members 220-1 to 220-8 are not fixed to the housing 140 and may be directly connected to the connection parts 530 of the outer frames 153 of the upper elastic member 150.

The connection parts 530 of the outer frames 153 of the upper elastic member 150 are spaced apart from the housing 140 and may thus be easily moved in the optical axis direction or in the first direction parallel to the optical axis.

The support members 220-1 to 220-8 in accordance with the embodiment are directly connected to the connection parts 530, which may be easily moved in the first direction, and may thus be easily moved in the optical axis direction or in the first direction parallel to the optical axis, as compared to general support members fixed to the housing 140, thereby improving accuracy in handshake correction. Particularly, stress according to fall or impact may be distributed and thereby deformation and disconnection of the support members 220-1 to 220-8 may be suppressed.

For example, one end of each of the first to fourth support members 220-1 to 220-4 may be bonded to the second coupling part 520 of the corresponding one of the first to fourth upper elastic members 150-1 to 150-4, and the other end of each of the first to fourth support members 220-1 to 220-2 may be bonded to the circuit board 250.

For example, one end of each of the fifth and seventh support members 220-5 and 220-7 may be bonded to the second coupling part of the outer frame of the corresponding one of the fifth and sixth upper elastic members 150-5 and 150-6, and the other end of each of the fifth and seventh support members 220-5 and 220-7 may be bonded to the circuit board 250.

For example, one end of each of the sixth and eighth support members 220-6 and 220-8 may be bonded to the first coupling part of the outer frame of the corresponding one of the fifth and sixth upper elastic members, and the other end of each of the sixth and eighth support members 220-8 may be bonded to the corresponding one of the first and second lower elastic members.

At least one of the first to fourth upper elastic members 150-1 to 150-6 may be conductively connected to the circuit board 250 through the support members 220-1 to 220-8.

Both ends of the first coil 120 may be connected to the inner frames of the second and fourth upper elastic members 150-2 and 150-4, and be conductively connected to the circuit board 250 by the second and fourth upper elastic members 150-2 and 150-4 and the second and fourth support members 220-2 and 220-4.

Both ends of the sensing coil 170 may be connected to the outer frames of the first and third upper elastic members 150-1 and 150-3, and be conductively connected to the circuit board 250 by the first and third upper elastic members 150-1 and 150-3 and the first and third support members 220-1 and 220-3.

Next, the base 210, the circuit board 250 and the second coil 230 will be described.

The base 210 may have a hollow corresponding to the hollow of the bobbin 110 and/or the hollow of the housing 140, and have a shape coinciding with or corresponding to the shape of the cover member 300, for example, a rectangular shape.

Figure 7:
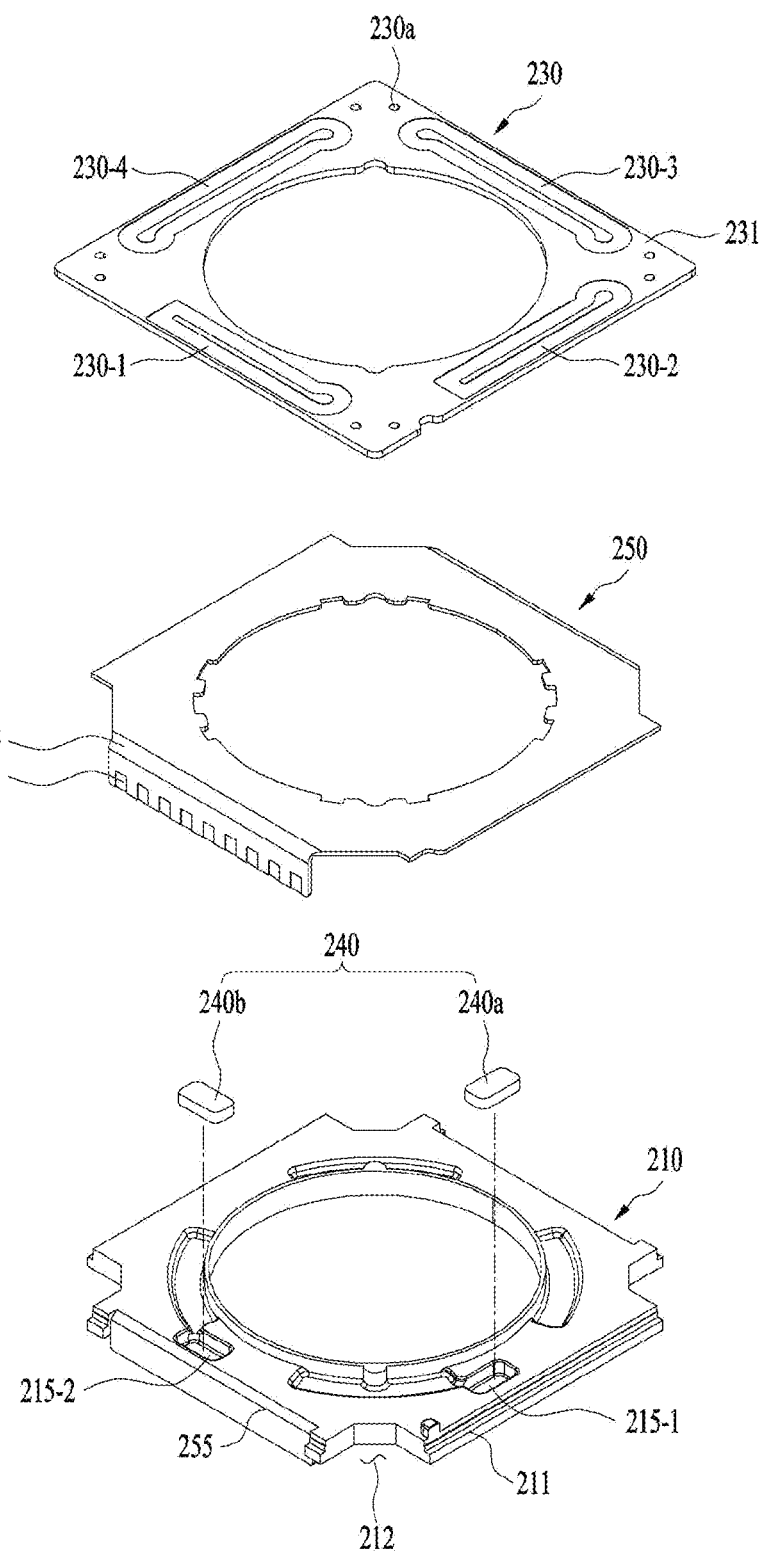
FIG. 7 is an exploded perspective view illustrating the base, a second coil and the circuit board shown in FIG. 1.

FIG. 7 is an exploded perspective view illustrating the base 210, the second coil 230 and the circuit board 250 shown in FIG. 1.

With reference to FIG. 7, the base 210 may include a staircase 211 which may be coated with an adhesive when the cover member 300 is adhered and fixed to the base 210. Here, the staircase 211 may guide the cover member 300 coupled to the upper side thereof, and the distal end of the cover member 300 may be in surface contact with the staircase 211.

A support part 255 may be formed on a surface of the base 210 facing a part of the circuit board 250 provided with terminals 251, and the support part 255 may have a size corresponding to the size of the part of the circuit board 250 provided with the terminals 251. The support part 255 of the base 210 may be formed on the outer surface of the base 210 so as to have a constant cross-section without the staircase 211, thus supporting a terminal surface 253 of the base 250.

Corners of the base 210 may have recesses 212. If the cover member 300 has protrusions at corners thereof, the protrusions of the cover member 300 may be coupled to the base 210 through the recesses 212.

Further, receiving recesses 215-1 and 215-2 in which the OIS position sensors 240 are disposed may be provided on the upper surface of the base 210. In accordance with the embodiment, two receiving recesses 215-1 and 215-2 may be provided on the base 210, and the OIS position sensors 240 may be disposed in the receiving recesses 215-1 and 215-2 of the base 210 and thus sense degrees of movement of the housing 140 in the second and third directions. For this purpose, virtual lines connecting the centers of the receiving recesses 215-1 and 215-2 to the center of the base 210 may intersect each other. For example, an angle formed by the virtual lines connecting the centers of the receiving recesses 215-1 and 215-2 to the center of the base 210 may be 90°, without being limited thereto.

The second coil 230 may be disposed above the circuit board 250, and the OIS position sensors 240 may be disposed below the circuit board 250. The OIS position sensors 240 may sense displacement of the housing 140 in a direction (for example, the x-axis or y-axis direction) vertical to the optical axis (for example, the z-axis) with respect to the base 210.

The OIS position sensors 240 may include a first OIS position sensor 240a and a second OIS position sensor 240b which are disposed perpendicular to each other to sense displacements of the housing 140 in directions vertical to the optical axis.

The circuit board 250 may be disposed on the upper surface of the base 210 and have a hollow corresponding to the hollow of the bobbin 110, the hollow of the housing 140 and/or the hollow of the base 210. The outer circumferential surface of the circuit board 250 may have a shape coinciding with or corresponding to the shape of the upper surface of the base 210, for example, a rectangular shape.

The circuit board 250 may include at least one terminal surface 253 which is bent from the upper surface of the circuit board 250 and provided with a plurality of pins or terminals 251 formed thereon to receive electrical signals supplied from the outside.

FIG. 7 illustrates the second coil 230 as being provided on a circuit member 231 formed separately from the circuit board 250, without being limited thereto, and, in accordance with another embodiment, the second coil 230 may be implemented as a ring-type coil block, as an FP coil, or as a circuit pattern formed on the circuit board 250.

The second coil 230 may include through holes 230a formed through the circuit member 231. The support members 220 may pass through the through holes 230a and be conductively connected to the circuit board 250.

The second coil 230 is disposed above the circuit board 250 so as to be opposite to the magnets 130 disposed on the housing 140.

The second coil 230 may include a total of four second coil parts, each of which is installed at each of four sides of the circuit board 250, without being limited thereto, or include a total of two second coil parts including one second coil part installed in the second direction and one second coil part installed in the third direction or a total of four or more second coil parts.

As described above, the housing 140 is moved in the second direction and/or the third direction by interaction between the magnets 130 and the second coil 230 which are disposed opposite to each other and may thus perform handshake correction.

The OIS position sensors 240a and 240b may be provided as Hall sensors, or employ any sensor which may sense the intensity of a magnetic field. For example, the OIS position sensors 240a and 240b may be implemented as drivers including Hall sensors or be implemented as position detection sensors themselves, such as Hall sensors.

A plurality of the terminals 251 may be installed on the terminal surface 253 of the circuit board 250.

For example, through the terminals 251 installed on the terminal surface 253 of the circuit board 250, the circuit board 250 may receive external power and then supply power to the first and second coils 120 and 230 and the first and OIS position sensors 170 and 240, may receive induced voltage output from the sensing coil 170 and then output the induced voltage to the outside, and may receive output signals output from the first and OIS position sensors 170 and 240 and then output the signals to the outside.

In accordance with the embodiment, the circuit board 250 may be provided as an FPCB, without being limited thereto, and the terminals of the circuit board 250 may be directly formed on the surface of the base 210 using a surface electrode method, etc.

The circuit board 250 may include through holes 250$a$1 and 250$a$2 through which the support members 220 may pass. The support members 220 may be conductively connected to a circuit pattern, which may be disposed on the bottom surface of the circuit board 250, through the through holes 250$a$1 and 250$a$2 by soldering, etc.

Further, in accordance with another embodiment, the circuit board 250 may exclude the through holes 250$a$1 and 250$a$2, and the support members 220 may be conductively connected to a circuit pattern or pads formed on the upper surface of the circuit board 250 by soldering, etc.

The circuit board 250 may further include through holes coupled to protrusions provided on the upper surface of the base 210. The protrusions of the base 210 and the through holes of the circuit board 250 may be fixed to each other by an adhesive member, such as epoxy.

Figure 8:
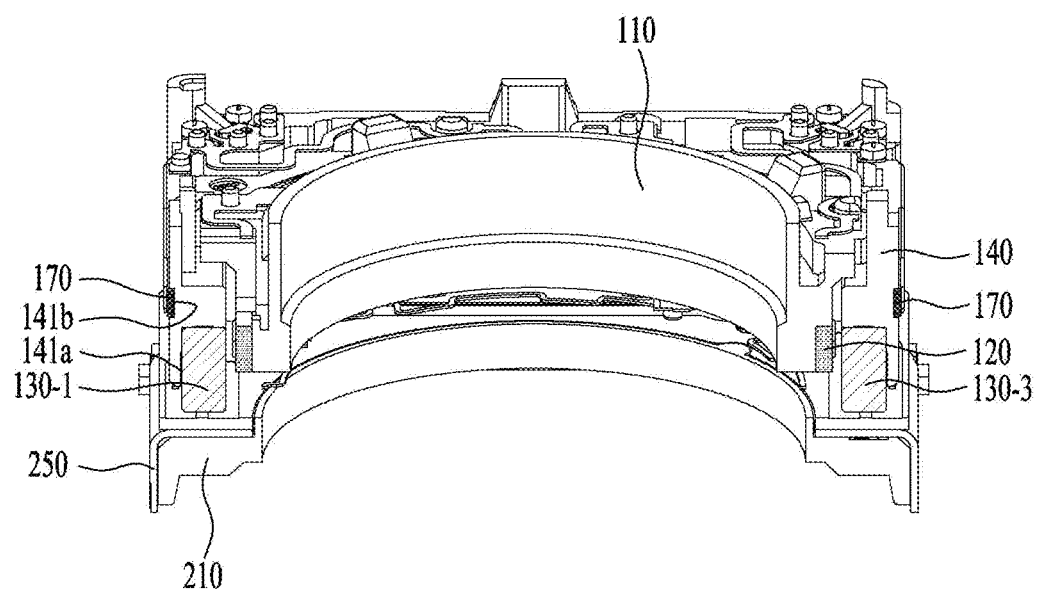
FIG. 8 is a cross-sectional view of the lens driving device shown in FIG. 2, taken along line I-I'.
Figure 9:
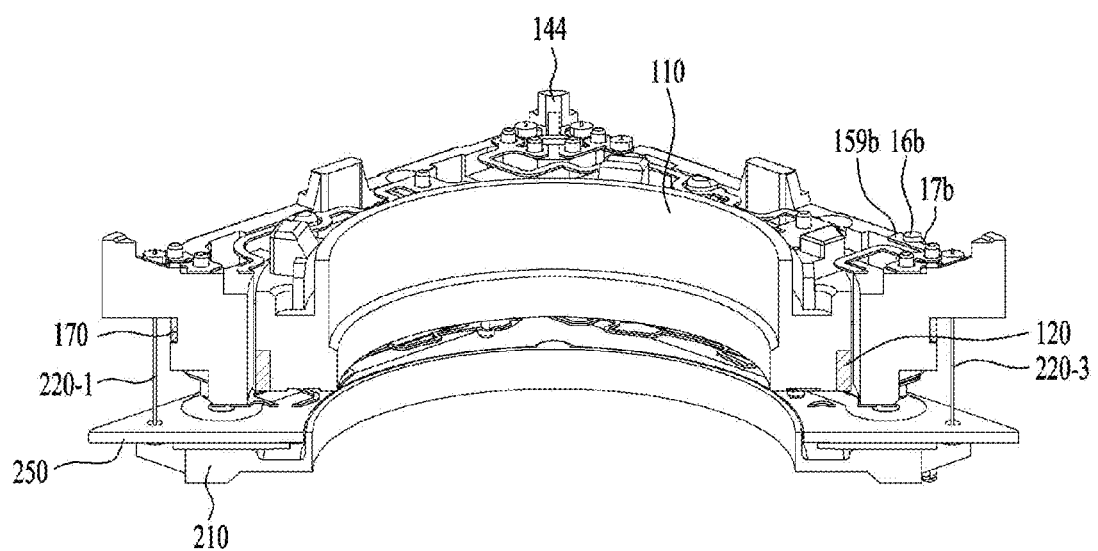
FIG. 9 is a cross-sectional view of the lens driving device shown in FIG. 2, taken along line II-II'.

FIG. 8 is a cross-sectional view of the lens driving device shown in FIG. 2, taken along line I-I', and FIG. 9 is a cross-sectional view of the lens driving device shown in FIG. 2, taken along line II-II'.

With reference to FIGS. 8 and 9, the sensing coil 170 may be disposed in or directly wound on the sensing coil receiving groove 141$b$ provided on the first side parts 141 of the housing 140.

At the initial position, the sensing coil 170 may not overlap the magnets 130 in the first direction. Further, at the initial position, the sensing coil 170 may not overlap the magnets 130 in a direction vertical to the first direction. The reason for this is to reduce interference between the magnets 130 and the sensing coil 170.

The initial position may be an initial position of the AF moveable unit under the condition that no power is applied to the first coil 120, or a position at which the AF moveable unit is located according to elastic deformation of the upper and lower elastic members 150 and 160 only by the weight of the AF moveable unit. The AF moveable unit may include the bobbin 110 and the elements mounted on the bobbin 110.

Further, at the initial position, the sensing coil 170 may be spaced apart from the first coil 120 by a predetermined interval in the first direction, and may not overlap the first coil 120 in a direction vertical to the first direction. The reason for this is to secure linearity in induced voltage induced in the sensing coil 170 by current of the first coil 120.

The relative positions of the sensing coil and the magnets shown in FIGS. 8 and 9 correspond to only one embodiment and, in accordance with another embodiment, at the initial position, the sensing coil 170 may overlap the magnets 130 in the first direction.

The sensing coil 170 may be located between the support members 220 and the second side parts of the housing 140. For example, the sensing coil 170 may be located at the sides of the second side parts 142 of the housing 140 with respect to the support members 220.

As described above, in the embodiment, the sensing coil 170 is directly wound on the first and second side parts 141 and 142 of the housing 140 and, thus, lowering of reliability in bonding between the sensing coil 170 and the housing 140 or between the sensing coil 170 and the upper elastic member 150 may be inhibited.

Further, since the sensing coil 170 is disposed below the upper elastic member 150 so as to be spaced apart from the upper elastic member 150, in the embodiment, there is no spatial limit in installing the upper elastic member 150 at the upper end of the housing 140.

Further, since each of the starting part and the ending part of the sensing coil 170 contacts the sensing coil guide part 18 provided in one region of the first side parts 141 or the second side parts 142 of the housing 140 and is bonded to one end 159$a$ or 159$b$ of the outer frame 152 of the upper elastic member 150 through soldering, soldering operation in the embodiment may be easily performed.

Figure 11:
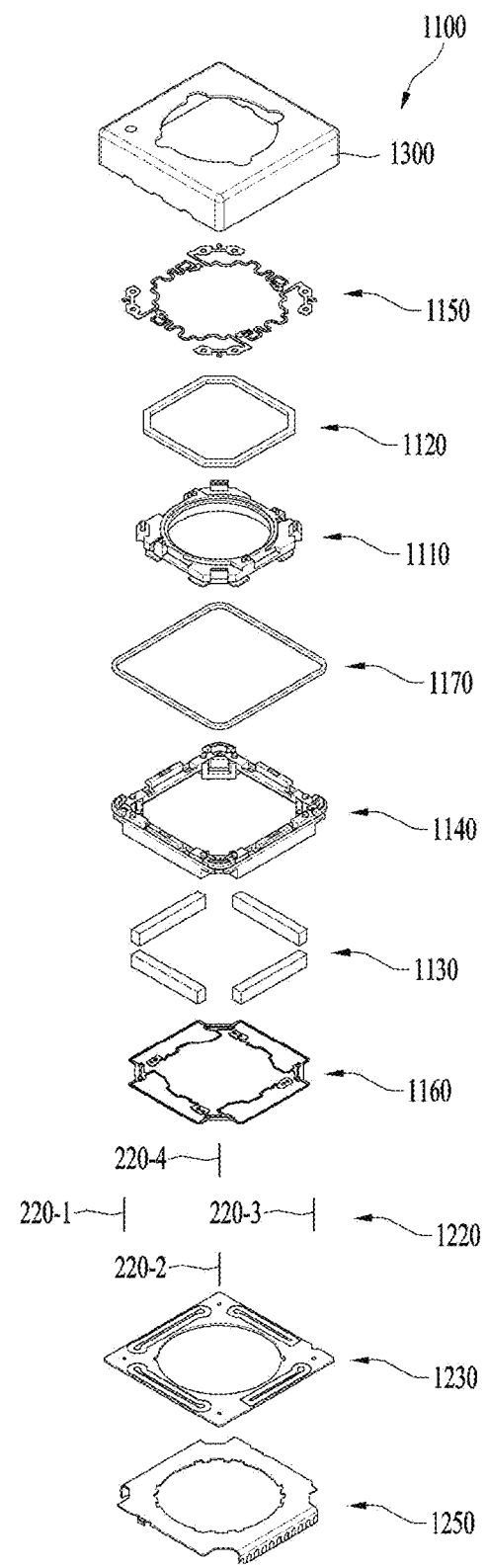
FIG. 11 is an exploded perspective view of a lens driving device in accordance with another embodiment.
Figure 12:
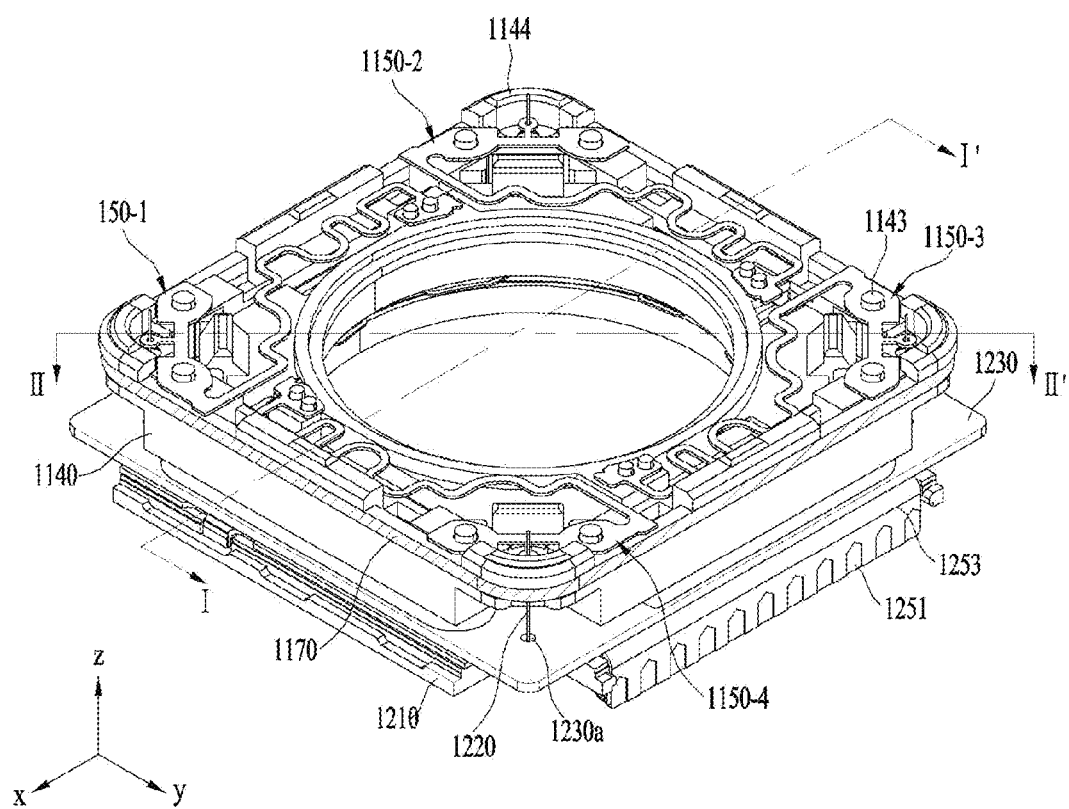
FIG. 12 is a perspective view illustrating an assembled state of the lens driving device of FIG. 11 excluding a cover member.

FIG. 11 is an exploded perspective view of a lens driving device 1100 in accordance with another embodiment, and FIG. 12 is a perspective view illustrating an assembled state of the lens driving device 1100 of FIG. 11 excluding a cover member 1300.

With reference to FIGS. 11 and 12, the lens driving device 1100 includes a bobbin 1110, a first coil 1120, magnets 1130, a housing 1140, an upper elastic member 1150, a lower elastic member 1160 and a sensing coil 1170.

Further, the lens driving device 1100 may further include support members 1220, a second coil 1230, Optical Image Stabilization (OIS) position sensors 1240, and a circuit board 1250. Further, the lens driving device 1100 may further include a base 1210 and the cover member 1300.

The description of the cover member 300 of FIG. 1 may be applied to the cover member 1300.

Figure 13:
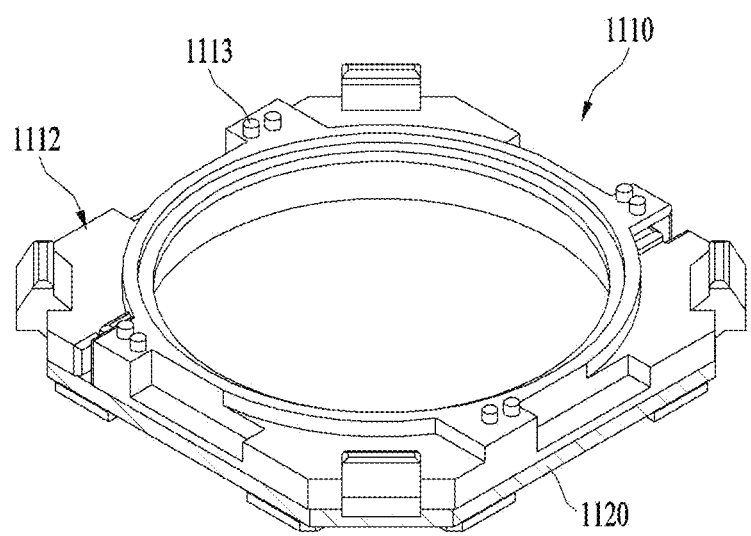
FIG. 13 is a perspective view of a bobbin shown in FIG. 12.

FIG. 13 is a perspective view of the bobbin 1100 shown in FIG. 12.

With reference to FIG. 13, the bobbin 110 is located within the housing 1140 and is movable in the first direction (for example, in the z-axis direction) by electromagnetic interaction between the coil 1120 and the magnets 1130.

The bobbin 1110 may include a lens barrel (not shown) including at least one lens installed therein, and the lens barrel may be coupled to the inside of the bobbin 1110 by various methods.

The bobbin 1110 may have a hollow to mount the at least one lens or the lens barrel therein. The shape of the hollow of the bobbin 1110 may coincide with the shape of the at least one lens or the lens barrel mounted therein and, for example, may be a circular, oval or polygonal shape, without being limited thereto.

The bobbin 1110 may include at least one upper support protrusion 1113 disposed on the upper surface thereof and coupled and fixed to an inner frame 1151 of the upper elastic member 1150, and at least one lower support protrusion (not shown) disposed on the lower surface thereof and coupled and fixed to an inner frame 1161 of the lower elastic member 1160.

The bobbin 1110 may include upper escape recesses 1112, each of which is provided in one region of the upper surface of the bobbin 1110, so as to correspond to or be aligned with a frame connection part 1153 of the upper elastic member 1150. Further, the bobbin 1110 may include lower escape recesses (not shown), each of which is provided in one region of the lower surface of the bobbin 1100, so as to correspond to or be aligned with a frame connection part 1163 of the lower elastic member 1160. Further, in accordance with another embodiment, a frame connection part of an upper elastic member and a bobbin may be designed so as not to interfere with each other and, in this case, upper escape recesses and/or lower escape recesses may be omitted.

The bobbin 1110 may have at least one groove (not shown), in which the first coil 120 is disposed, formed on the outer circumferential surface thereof. The first coil 1120 is disposed or received in the groove, or the first coil 1120 may be directly wound on the groove so as to be rotated in the clockwise direction or in the counterclockwise direction about the optical axis. The shape and the number of the at least one groove may correspond to the shape and the number of coils disposed on the outer circumferential surface of the bobbin 1110. In accordance with another embodiment, the bobbin 1110 may have no coil receiving groove and the first coil 1120 may be directly wound on and fixed to the outer circumferential surface of the bobbin 1110.

The first coil 1120 is disposed on the outer circumferential surface of the bobbin 1110, and the first coil 1120 may be a driving coil which electromagnetically interacts with the magnets 1310 disposed on the housing 1140. In order to generate electromagnetic force due to electromagnetic interaction between the first coil 1120 and the magnets 1130, a driving signal (for example, a driving current) may be applied to the first coil 1120.

An AutoFocus (AF) moveable unit may be moved in the first direction by the electromagnetic force due to electromagnetic interaction between the first coil 1120 and the magnets 1130. The movement of the AF moveable unit in the first direction may be controlled by adjusting electromagnetic force by controlling a driving signal applied to the first coil 1120 and, thereby, an autofocus function may be performed.

The AF moveable unit may include the bobbin 1110 elastically supported by the upper and lower elastic members 1150 and 1160, and elements mounted on the bobbin 1110 and moved together with the bobbin 1110. For example, the AF moveable unit may include the bobbin 1110, the first coil 1210 and the lens (not shown) mounted on the bobbin 1110.

The first coil 1120 may be wound on the outer circumferential surface of the bobbin 1110 so as to be rotated in the clockwise direction or the counterclockwise direction about the optical axis. In accordance with another embodiment, the first coil 1120 may be implemented as coil rings wound in the clockwise direction or the counterclockwise direction about an axis vertical to the optical axis, and the number of the coil rings may be the same as the number of the magnets 1130, without being limited thereto.

The first coil 1120 may be conductively connected to at least one of the upper elastic member 1150 or the lower elastic member 1160 so as to receive a driving signal.

The housing 1140 may support the magnets 1130 and the sensing coil 1170, and receive the bobbin 1110 therein so as to move the bobbin 1110 in the first direction by electromotive force caused by interaction between the first coil 1120 and the magnets 1130.

Figure 14:
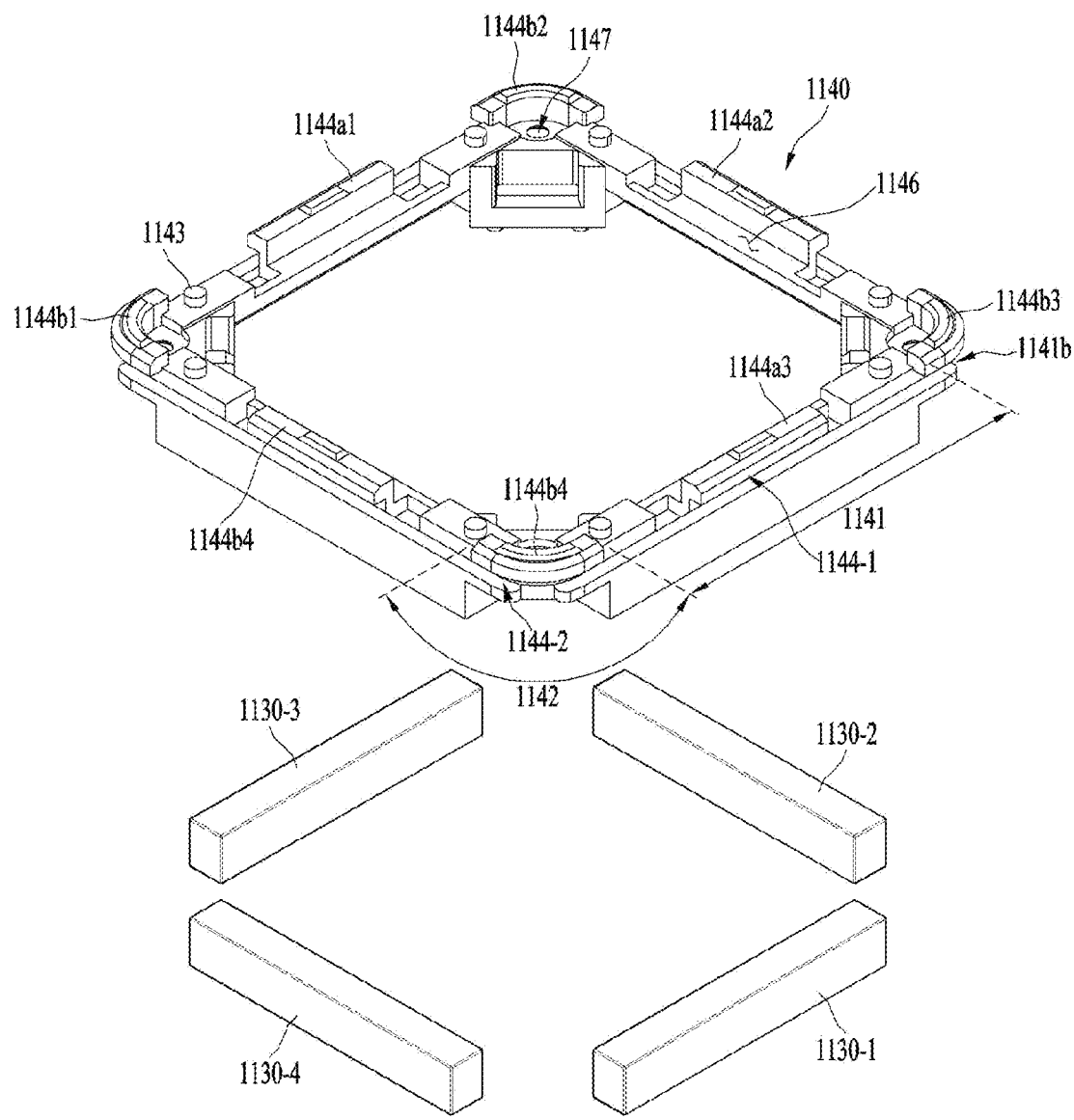
FIG. 14 is a first exploded perspective view illustrating a housing and magnets shown in FIG. 11.
Figure 15:
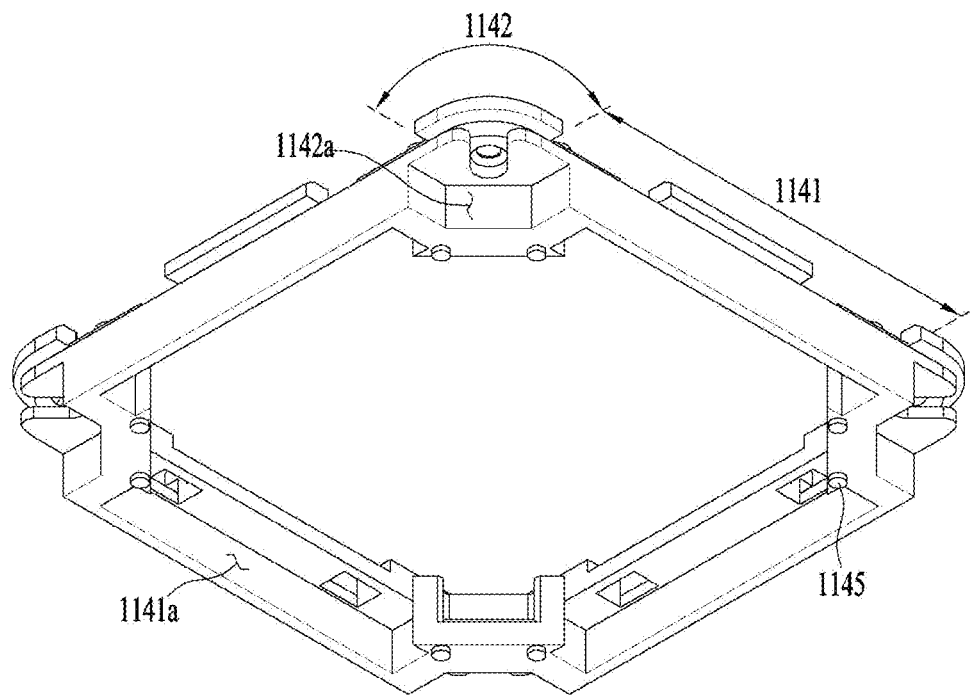
FIG. 15 is a second exploded perspective view illustrating the housing and the magnets shown in FIG. 11.
Figure 15:
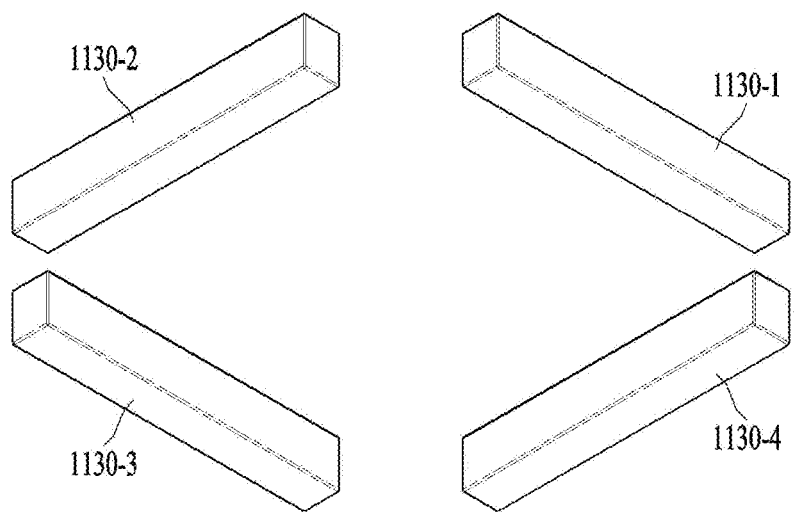

FIG. 14 is a first exploded perspective view illustrating the housing 1140 and the magnets 1130 shown in FIG. 11, and FIG. 15 is a second exploded perspective view illustrating the housing 1140 and the magnets 1130 shown in FIG. 11.

With reference to FIGS. 14 and 15, the housing 1140 may generally have a hollow pillar shape. For example, the housing 1140 may have a polygonal (for example, rectangular or octagonal) or circular hollow.

The housing 1140 may include a plurality of side parts 1141 and 1142. For example, the housing 1140 may include first side parts 1141 which are spaced apart from one another, and second side parts 142 which are spaced apart from the first side parts 1141.

For example, the width of each of the first side parts 1141 may be greater than the width of each of the second side parts 1142.

The magnets 1130 may be disposed or installed on the first side parts 1141 of the housing 1140.

Each of the second side parts 1142 of the housing 1140 may be located between two neighboring first side parts and interconnect the first side parts 1141. The support members 1220 may be disposed in the second side parts 1142 of the housing 1140. For example, the support members 1120 may be coupled to outer frames 1152 of the upper elastic member 1150 via through holes 1147 formed through the second side parts 1142.

The first side parts 1141 of the housing 1140 may interconnect the second side parts 1142 of the housing 1140, and include a flat surface having a designated depth. Each of the first side parts 1141 of the housing 1140 may have an area which is the same as or greater than the area of the corresponding magnet 1130.

The housing 1140 may have magnet receiving parts 1141a to receive the magnets 1130 therein, and a sensing coil receiving groove 1141b to wind or receive the sensing coil 1170 thereon or therein.

The magnet receiving part 1141a may be provided at the lower end of the inner surface of at least one of the first side parts 1141 of the housing 140. For example, the magnet receiving part 1141a may be provided at the lower end of the inner surface of each of the four first side parts, and each of the magnets 130 may be inserted into or fixed to the corresponding one of the magnet receiving parts 1141a.

The magnet receiving parts 1141a of the housing 1140 may be formed as recesses having a size corresponding to the size of the magnets 1130. Openings may be formed on the bottom surfaces of the magnet receiving parts 1141a of the housing 140 opposite to the second coil 1230, and bottom surfaces of the magnets 1310 fixed to the magnet receiving parts 1141a may be opposite to the second coil 1230.

The sensing coil receiving groove 1141b of the housing 1140 may be formed as a recess on the outer surface of at least one of the first side parts 1141 or the second side parts 1142 of the housing 1140, and be extended from one end to the other end of each of the first side parts 1141 and/or the second side parts 1142. For example, the sensing coil receiving groove 1141a of the housing 1140 may be formed at the upper ends of the outer surfaces of the first and second side parts 1141 and 1142.

The depth of the sensing coil receiving groove 1141b may be greater than or the same as the thickness of the sensing coil 1170 wound thereon.

The sensing coil receiving grooves 1141b may be located above the magnet receiving parts 1141a in which the magnets 1130 are received. For example, the sensing coil receiving grooves 1141b may not overlap the magnet receiving parts 1141a in a direction vertical to the first direction, without being limited thereto.

The first side parts 1141 of the housing 1140 may be disposed in parallel to the side surfaces of the cover member 1300. Further, the area of the first side parts 1141 of the housing 140 may be greater than the area of the second side parts 1142.

The second side parts 1142 of the housing 1140 may have through holes 1147 forming paths through which the support members 220 pass. For example, the housing 1140 may include the through holes 1147 formed through upper portions of the second side parts 1142. The number of the through holes 1147 may be the same as the number of the support members.

Further, in order to inhibit direct collision with the inner surface of the cover member 1300 shown in FIG. 1, stoppers 1144 may be provided at the upper end or on the upper surface of the housing 1140.

For example, the stoppers 1144 may include first stoppers 1144a1 to 1144a4 disposed at the upper ends or on the upper surfaces of the first side parts 1141 of the housing 1140, and second stoppers 1144b1 to 1144b4 disposed at the upper ends or on the upper surfaces of the second side parts 1142.

The first stoppers 1144a1 to 1144a4 may be disposed so as to be spaced apart from one another, and the second stoppers 1144b1 to 1144b4 may be disposed so as to be spaced apart from one another. Further, the first stoppers 1144a1 to 1144a4 and the second stoppers 1144b1 to 1144b4 may be disposed so as to be spaced apart from each other.

For example, the upper end of the sensing coil receiving groove 1141b may contact the lower ends of the first stoppers 1144a1 to 1144a4 and the second stoppers 1144b1 to 1144b4.

The sensing coil receiving groove 1141b may include first grooves 1144-1 provided on the first side parts 1141, and second grooves 1144-2 provided on the second side parts 1142.

The second grooves 1144-2 of the sensing coil receiving groove 1141b may be located at the outside of the through holes 1147, through which the support members 1220 pass.

For example, the second grooves 1144-2 of the sensing coil receiving groove 1141b may be located farther away from a virtual straight line, which passes through the center of the hollow of the housing 1140 and is parallel to the optical axis, than the through holes 1147.

For example, a first distance between the virtual straight line, which passes through the center of the hollow of the housing 1140 and is parallel to the optical axis, and the second grooves 1144-2 of the sensing coil receiving groove 1141b may be greater than a second distance between the virtual straight line, which passes through the center of the hollow of the housing 1140 and is parallel to the optical axis, and the through holes 1147.

The housing 1140 may have at least one upper support protrusion 1143 provided at the upper end or on the upper surface thereof so as to be coupled to the outer frames 1152 of the upper elastic member 1150.

The upper support protrusion 1143 may be formed on the upper surface of at least one of the first side parts 1141 or the second side parts 1142 of the housing 1140. For example, the upper support protrusion 1143 may be disposed at the upper ends or on the upper surfaces of the first side parts 1141 between the first stoppers 1144a1 to 1144a4 and the second stoppers 1144b1 to 1144b4.

Further, the housing 1140 may have lower support protrusions 1145 provided on the lower surface thereof so as to be coupled and fixed to outer frames 1162 of the lower elastic member 1160.

In order to secure a space filled with gel-type silicone serving as a damper as well as to form the paths through which the support members 1220 pass, the housing 1140 may have recesses 1142a formed on the second side parts 1142. That is, the recesses 1142a of the housing 1140 may be filled with damping silicone.

The housing 140 may have at least one stopper 1149 protruding from the outer surfaces of the first side parts 141. In order to inhibit collision of the housing 140 with the cover member 1300 when the housing 140 is moved in the second and/or third direction, the stoppers 149 may protrude from the first side parts 141 in the second or third direction.

In order to inhibit collision of the bottom surface of the housing 1140 with the base 1210 and/or the circuit board 1250, which will be described later, the housing 1140 may further include stoppers (not shown) protruding from the lower surface thereof, the housing 1140 may be spaced apart from the base 1210 located below the housing 1140 and the cover member 1300 located above the housing 1140 by the stoppers formed on the upper and lower surfaces of the housing 1140 and thus maintain a length in the optical axis direction without upper and lower interference. Therefore, the housing 1140 may perform shifting operation in the second and third directions, i.e., the forward and backward directions and the leftward and rightward directions, in the plane vertical to the optical axis.

Next, the magnets 1130; 1130-1 to 1130-4 will be described.

The magnets 1130 may be disposed on the housing 1140 so that at least a part of the magnets 1130 overlap the first coil 1120 in a direction vertical to the optical axis. For example, the magnets 130 may be inserted into or disposed in the receiving parts 1141a of the housing 1140.

The magnets 1130 may be disposed so as to be spaced apart from the sensing coil 1170 mounted on the housing 1140, and a part of the housing 1140 may be disposed between the sensing coil 1170 and the magnets 1130.

For example, the magnets 1130 may be disposed below the sensing coil 1170. For example, in order to reduce interference between the magnets 1130 and the sensing coil 1170, the magnets 1130 and the sensing coil 1170 may be disposed so as not to overlap each other in the optical axis direction at an initial position, without being limited thereto.

For example, the sensing coil 1170 may be disposed on the outer surfaces of the first and second side parts 141 and 142 of the housing 140, and the magnets 130 may be disposed on the inner surfaces of the first side parts 141 of the housing 1140.

In accordance with another embodiment, the magnets 1130 may be disposed on the outer surfaces of the first side parts 1141 of the housing 1140 so as to be spaced apart from the sensing coil 1170.

The magnets 1130 may have a shape corresponding to the shape of the first side parts 1141 of the housing 1140, for example, a rectangular parallelepiped shape, without being limited thereto.

The magnet 130 may be formed as one body and be disposed such that one surface of the magnet 130 opposite to the first coil 1120 forms the S pole and the opposite surface of the magnet 130 forms the N pole. However, the disclosure is not limited thereto, and vise versa.

At least two magnets 1130 may be installed so as to be opposite to each other. For example, two pairs of magnets 1130, which are opposite to each other so as to intersect each other, may be disposed on the housing 1140. Here, the magnets 1130 may have an approximately rectangular cross-section or, differently, have a triangular or rhomboid cross-section.

For example, the magnet 1130 may be disposed on each of two first side parts being opposite to each other, out of the first side parts 1141 of the housing 1140.

Next, the upper elastic member 1150, the lower elastic member 1160 and the support members 1220 will be described.

The upper elastic member 1150 and the lower elastic member 1160 elastically support the bobbin 1110. The upper elastic member 1150 is connected to the upper portion of the bobbin 1110 and the upper portion of the housing 1140 and thus support the upper portion of the bobbin 1110 and the upper portion of the housing 1140. The lower elastic member 160 is connected to the lower portion of the bobbin 1110 and the lower portion of the housing 1140 and thus support the lower portion of the bobbin 1110 and the lower portion of the housing 1140.

The support members 1220 may support the housing 1140 so as to be movable with respect to the base 1210 in a direction vertical to the optical axis, and conductively connect at least one of the upper or lower elastic member 1150 or 1160 to the circuit board 2150. For example, the support members 1220 may conductively connect the upper elastic member 1150 to the circuit board 1250.

Figure 16:
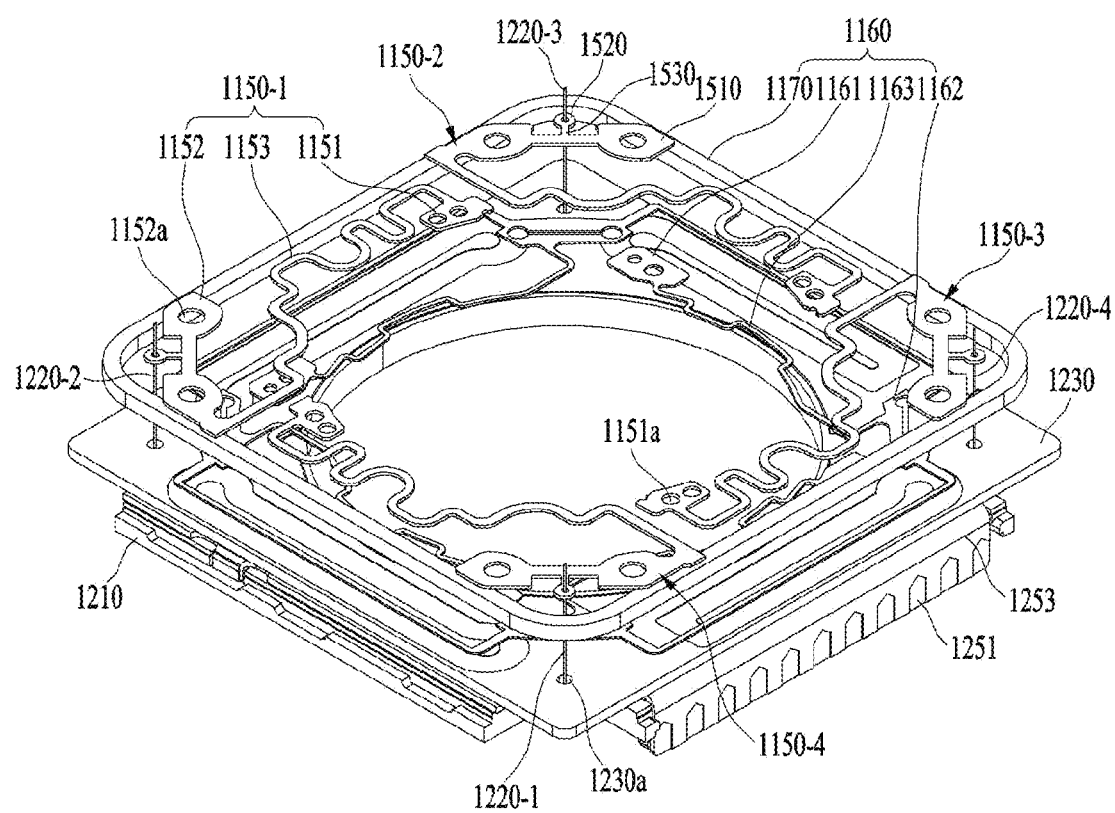
FIG. 16 is a perspective view illustrating an assembled state of an upper elastic member, a lower elastic member, a base, support members and a circuit board shown in FIG. 11.

FIG. 16 is a perspective view illustrating an assembled state of the upper elastic member 1150, the lower elastic member 1160, the base 1210, the support members 1220 and the circuit board 1250 shown in FIG. 11.

With reference to FIG. 16, the upper elastic member 1150 may be divided into two or more upper elastic members. For example, the upper elastic member 150 may include first to fourth upper elastic members 1150-1 to 1150-4 which are electrically separated from one another and are spaced apart from one another. For example, the first to fourth upper elastic members 1150-1 to 1150-4 may be disposed so as to be symmetrical about the center of the bobbin 1110 or the housing 1140 in the x-y plane, i.e., to form point symmetry. Here, point symmetry means symmetry in which, when two shapes are rotated 180° about a center of rotation, the two shapes exactly overlap each other.

Any one of the first to fourth upper elastic members 1150-1 to 1150-4 may be conductively connected to the corresponding one of the support members 1220. For example, each of the first to fourth upper elastic members 1150-1 to 1150-4 may be directly connected to the corresponding one of first to fourth support members 1220-1 to 1220-4.

Each of the first to fourth upper elastic members 1150-1 to 1150-4 may include the inner frame 1151 connected to the bobbin 1110, the outer frame 1152 connected to the housing 1140, and the frame connection part 1153 connecting the inner frame 1151 and the outer frame 1152.

For example, through holes 1151a coupled to the upper support protrusions 1113 of the bobbin 1110 may be formed through the inner frame 1151, and through holes 1152a coupled to the upper support protrusions 1143 of the housing 1140 may be formed through the outer frame 1152.

The inner frames of two upper elastic members selected from the first to fourth upper elastic members 1150-1 to 1150-4 may be conductively connected to both ends of the first coil 120.

Further, the outer frames of the other two upper elastic members selected from the first to fourth upper elastic members 1150-1 to 1150-4 may be conductively connected to both ends of the sensing coil 1170.

For example, by soldering, a starting part of the sensing coil 1170 may be directly bonded to the outer frame of any one of the first to fourth upper elastic members 1150-1 to 1150-4, and an ending part of the sensing coil 1170 may be directly bonded to the outer frame of another of the first to fourth upper elastic members 1150-1 to 1150-4.

Further, the outer frame 1152 of each of the first to fourth upper elastic members 1150-1 to 1150-4 may be connected to at least one of the support members 220-1 to 220-4. For example, each of the outer frames 1152 of the first to fourth upper elastic members 1150-1 to 1150-4 may be connected to one end of the corresponding one of the support members 220-1 to 220-4.

The frame connection parts 1153 may be bent at least once, thus forming a pattern of a designated shape. The ascending and/or descending operation of the bobbin 1110 in the first direction may be flexibly supported through positional change and fine deformation of the frame connection parts 1153.

The outer frame 1152 of each of the first to fourth upper elastic members 1150-1 to 1150-4 may include a first coupling part 1510 coupled to the housing 1140, a second coupling part 1520 coupled to the corresponding support member 1220, and a connection part 1530 connecting the first coupling part 1510 and the second coupling part 1520.

The support members 1220-1 to 1220-4 may be directly bonded to the second coupling parts 1520 of the outer frames 1152 by soldering or a conductive adhesive member (for example, conductive epoxy).

The connection part 1530 may have a straight shape or a shape which is bent at least once, and the width of the connection part 1530 may be less than the width of the frame connection part 1153 of the upper elastic member 1150. Since the width of the connection part 1530 is less than the width of the frame connection part 153 of the upper elastic member 1150, the connection part 1530 may be easily moved in the first direction and thereby distribute stress applied to the upper elastic member 1150 and stress applied to the support member 1220.

The lower elastic member 1160 may include the inner frames 1161 coupled to the lower coupling protrusions of the bobbin 1110, the outer frames 1162 coupled to the lower support protrusions of the housing 1140, and the connection parts 1163 connecting the inner frames 1161 and the outer frames 1162.

FIG. 16 illustrates one lower elastic member 1160 which is not divided but, in accordance with another embodiment, the lower elastic member 1160 may be divided into two or more lower elastic members.

The sensing coil 1170 is directly wound on the side portion of the housing 1140, for example, the side parts 1141 and 1142 of the housing 1140. For example, the sensing coil 1170 may be directly wound on the sensing coil receiving groove 1141b provided on the first and second side parts 1141 and 1142 of the housing 1140 so as to be rotated in the clockwise direction or the counterclockwise direction about the optical axis. For example, the sensing coil 1170 may be formed in a ring shape so as to be directly wound on the housing 1140.

If the sensing coil 1170 is implemented as a coil block and then bonded to the upper end of the housing 1140, manual work to receive and bond the sensing coil in and to the housing is required. In this case, it is not easy to implement a block of the sensing coil satisfying the shape of the upper surface of the housing, and the sensing coil is bonded to the housing through manual work and thus reliability in bonding between the sensing coil and the housing may be lowered. Further, since the sensing coil is disposed at the upper end of the housing adjacent to the upper elastic members, installation of the upper elastic members may be limited and bonding and soldering with the upper elastic members are not easy.

On the other hand, in the embodiment, the sensing coil 1170 is directly wound on the sensing coil receiving grooves 1141b provided on the first and second side parts 1141 and 1142 of the housing 1140, manual work to receive or bond the sensing coil 1170 in or to the upper end of the housing 1140 is not necessary and, thus, lowering of reliability in bonding between the sensing coil 1170 and the housing 1140 and between the sensing coil 1170 and the upper elastic member 1150 may be inhibited.

Further, since the sensing coil 1170 is disposed below the upper elastic member 1150 so as to be spaced apart from the upper elastic member 1150, there is no spatial limit in installing the upper elastic member 1150 at the upper end of the housing 1140.

Further, since the sensing coil 1170 is disposed such that each of the starting part and the ending part of the sensing coil 1170 contacts one region of the first side parts 1141 or the second side parts 1142 of the housing 1140 and is bonded to one region of the outer frame 1152 of the upper elastic member 1150 through soldering, soldering operation in the embodiment may be easily performed.

A driving signal applied to the first coil 1120 may be an AC signal, for example, a sinusoidal signal or a pulse signal (for example, a Pulse Width Modulation (PWM) signal). Further, in accordance with another embodiment, a driving signal applied to the first coil 1120 may include an AC signal and a DC signal. Application of an AC signal to the first coil 1120 serves to generate electromotive force or induced voltage in the sensing coil 1170 due to mutual induction.

The first coil 1120 together with the bobbin 1110 may be moved in the first direction by electromagnetic force caused by electromagnetic interaction between current flowing in the first coil 1120 and the magnets 1130 by the driving signal.

As the first coil 1120 is moved in the first direction, a distance between the first coil 1120 and the sensing coil 1170 is changed, and induced voltage may be generated in the sensing coil 1170 according to such distance change. For example, as the distance is decreased, induced voltage generated in the sensing coil 1170 may be increased and, on the other hand, as the distance is increased, induced voltage generated in the sensing coil 1170 may be decreased.

Displacements of the first coil 1120 and the bobbin 1110 may be sensed based on the induced voltage generated in the sensing coil 1170, and the displacement of the bobbin 1110 or the driving signal may be fed back based on the sensed displacements.

The sensing coil 1170 may be disposed below the upper elastic member 1150 disposed on the upper surface of the housing 1140, and be disposed above the magnets 1130 disposed on the housing 1140.

The support members 1220 may include a plurality of support members 1220-1 to 1220-4, and the support members 1220-1 to 1220-4 may be disposed so as to correspond to the second side parts 1142 of the housing 1140. For example, each of the support members 1220-1 to 2120-4 may be disposed adjacent to the corresponding one of the four second side parts 1142, and one end of the support member 1220 may be bonded to the outer frame 1152 of the upper elastic member 1150 disposed at the corresponding second side part. Otherwise, in accordance with another embodiment, the support member 1220 may be disposed as a leaf spring provided at the first side part 1141 of the housing 140.

The support members 1220-1 to 1220-4 may form paths to transmit a driving signal from the circuit board 1250 to the first coil 1120, and form paths to transmit induced voltage output from the sensing coil 1170 to the circuit board 1250.

The support members 1220-1 to 1220-4 may be implemented as support members using elasticity, for example, leaf springs, coil springs, suspension wires, etc. Further, in accordance with another embodiment, the support members 220 may be formed integrally with the upper elastic members.

The support members 1220-1 to 1220-4 may be spaced apart from the housing 1140, and the support members 1220-1 to 1220-4 are not fixed to the housing 1140 and may be directly connected to the connection parts 1530 of the outer frames 1153 of the upper elastic member 150.

The connection parts 1530 of the outer frames 1153 of the upper elastic member 1150 are spaced apart from the housing 1140 and may thus be easily moved in the first direction.

The support members 1220-1 to 1220-4 in accordance with the embodiment are directly connected to the connection parts 1530, which may be easily moved in the first direction, and may thus be easily moved in the first direction, as compared to general support members fixed to the housing 1140, thereby improving accuracy in handshake correction. Particularly, stress due to fall or impact may be distributed and thereby deformation and disconnection of the support members 1220-1 to 1220-4 may be suppressed.

The first to fourth upper elastic members 1150-1 to 1150-4 may be conductively connected to the circuit board 1250 through the support members 1220-1 to 1220-4.

For example, both ends of the first coil 1120 may be connected to the inner frames of the first and second upper elastic members 1150-1 and 1150-2, and be conductively connected to the circuit board 1250 by the first and second upper elastic members 1150-1 and 1150-2 and the support members 1220-1 and 1220-2.

Further, for example, both ends of the sensing coil 1170 may be connected to the inner frames of the third and fourth upper elastic members 1150-3 and 1150-4, and be conductively connected to the circuit board 1250 by the third and fourth upper elastic members 1150-3 and 1150-4 and the support members 1220-3 and 1220-4.

The support members 1220-1 to 1220-4 may be located at the inside of the ring-shaped sensing coil 1170.

Next, the base 1210, the circuit board 1250 and the second coil 1230 will be described. The base 1210 may have a hollow corresponding to the hollow of the bobbin 1110 and/or the hollow of the housing 1140, and have a shape coinciding with or corresponding to the shape of the cover member 1300, for example, a rectangular shape.

Figure 17:
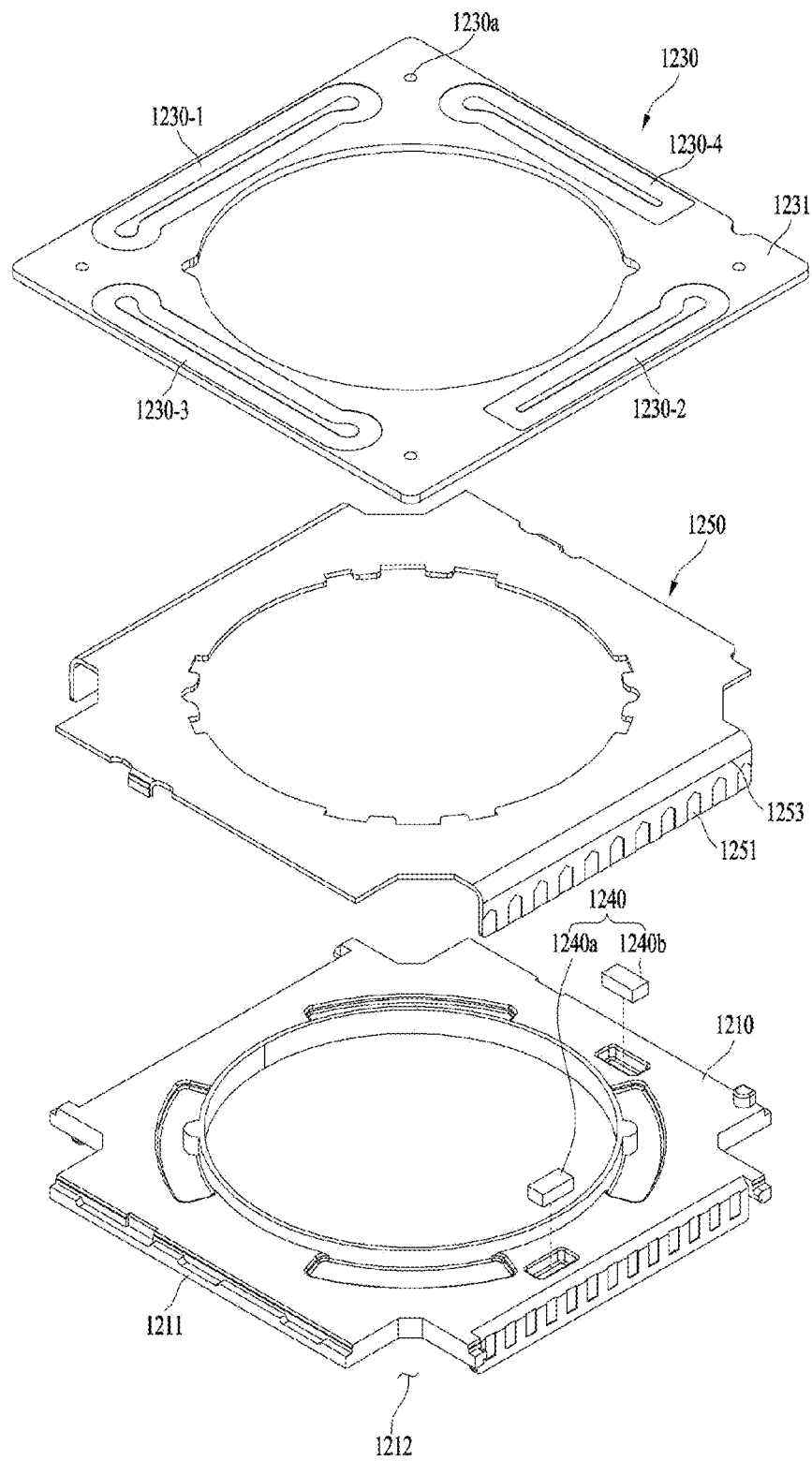
FIG. 17 is an exploded perspective view illustrating the base, a second coil and the circuit board shown in FIG. 11.

FIG. 17 is an exploded perspective view illustrating the base 1210, the second coil 2130 and the circuit board 1250 shown in FIG. 11.

With reference to FIG. 17, the base 1210 may include a staircase 211 which may be coated with an adhesive when the cover member 1300 is fixed to the base 1210. Here, the staircase 1211 may guide the cover member 1300 coupled to the upper side thereof, and the distal end of the cover member 1300 may be in surface contact with the staircase 1211.

A support part 1255 may be formed on a surface of the base 1210 facing a part of the circuit board 1250 provided with terminals 1251, and the support part 1255 may have a size corresponding to the size of the part of the circuit board 1250 provided with the terminals 1251. The support part 1255 of the base 2110 may be formed on the outer surface of the base 1210 so as to have a constant cross-section without a staircase 1211, thus supporting a terminal surface 1253 of the base 1250.

Corners of the base 1210 may have recesses 1212. If the cover member 1300 has protrusions at corners thereof, the protrusions of the cover member 1300 may be coupled to the base 1210 through the recesses 1212.

Further, receiving recesses 1215-1 and 1215-2 in which the OIS position sensors 1240 are disposed may be provided on the upper surface of the base 1210. In accordance with the embodiment, two receiving recesses 1215-1 and 1215-2 may be provided on the base 1210, and the OIS position sensors 1240 may be disposed in the receiving recesses 1215-1 and 1215-2 of the base 1210 and thus sense degrees of movement of the housing 1140 in the second and third directions. For this purpose, virtual lines connecting the centers of the receiving recesses 1215-1 and 1215-2 to the center of the base 1210 may intersect each other. For example, an angle formed by the virtual lines connecting the centers of the receiving recesses 1215-1 and 1215-2 to the center of the base 1210 may be 90°, without being limited thereto.

The second coil 1230 may be disposed above the circuit board 1250, and the OIS position sensors 1240 may be disposed below the circuit board 1250.

The OIS position sensors 1240 may sense displacement of the housing 1140 in a direction (for example, the x-axis or y-axis direction) vertical to the optical axis (for example, the z-axis) with respect to the base 1210. For example, the OIS position sensors 1240 may sense change in magnetic force of the magnets 1130 according to movement of the housing 1140 and output a signal according to a sensed result.

The OIS position sensors 1240 may include a first OIS position sensor 1240a and a second OIS position sensor 1240b which are disposed perpendicular to each other to sense displacements of the housing 1140 in directions vertical to the optical axis.

The circuit board 1250 may be disposed on the upper surface of the base 1210 and have a hollow corresponding to the hollow of the bobbin 1110, the hollow of the housing 1140 and/or the hollow of the base 1210. The outer circumferential surface of the circuit board 1250 may have a shape coinciding with or corresponding to the shape of the upper surface of the base 1210, for example, a rectangular shape.

The circuit board 1250 may include at least one terminal surface 1253 which is bent from the upper surface of the circuit board 1250 and provided with a plurality of pins or terminals 1251 formed thereon to receive electrical signals supplied from the outside.

FIG. 17 illustrates the second coil 1230 as being provided on a circuit member 1231 formed separately from the circuit board 1250, without being limited thereto, and, in accordance with another embodiment, the second coil 1230 may be implemented as a ring-type coil block, as an FP coil, or as a circuit pattern formed on the circuit board 1250.

The second coil 1230 may include through holes 1230a formed through the circuit member 231. The support members 220 may pass through the through holes 1230a and be conductively connected to the circuit board 1250.

The second coil 230 is disposed above the circuit board 250 so as to be opposite to the magnets 1130 disposed on the housing 1140.

The second coil 1230 may include a total of four second coil parts, each of which is installed at each of four sides of the circuit board 1250, without being limited thereto, or include a total of two second coil parts including one second coil part installed in the second direction and one second coil part installed in the third direction or a total of four or more second coil parts.

The housing 1140 is moved in the second direction and/or the third direction by interaction between the magnets 1130 and the second coil 1230 installed opposite to each other and may thus perform handshake correction.

The OIS position sensors 1240a and 2140b may be provided as Hall sensors, or employ any sensor which may sense the intensity of a magnetic field. For example, the OIS position sensors 1240a and 1240b may be implemented as drivers including Hall sensors or be implemented as position detection sensors themselves, such as Hall sensors.

A plurality of the terminals 1251 may be installed on the terminal surface 1253 of the circuit board 1250.

For example, through the terminals 1251 installed on the terminal surface 1253 of the circuit board 1250, the circuit board 1250 may receive external power and then supply power to the first and second coils 1120 and 1230 and the OIS position sensors 1240, may receive induced voltage output from the sensing coil 1170 and then output the induced voltage to the outside, and may receive output signals output from the OIS position sensors 1240 and then output the signals to the outside.

In accordance with the embodiment, the circuit board 1250 may be provided as an FPCB, without being limited thereto, and the terminals of the circuit board 1250 may be directly formed on the surface of the base 1210 using a surface electrode method, etc.

The circuit board 2150 may include recesses (not shown) or through holes through which the support members 1220 may pass. The support members 1220 may be conductively connected to a circuit pattern, which may be disposed on the bottom surface of the circuit board 1250, through the through holes or recesses by soldering, etc.

Further, in accordance with another embodiment, the circuit board 1250 may exclude through holes, and the support members 1220 may be conductively connected to a circuit pattern or pads formed on the upper surface of the circuit board 1250 by soldering, etc.

Figure 18:
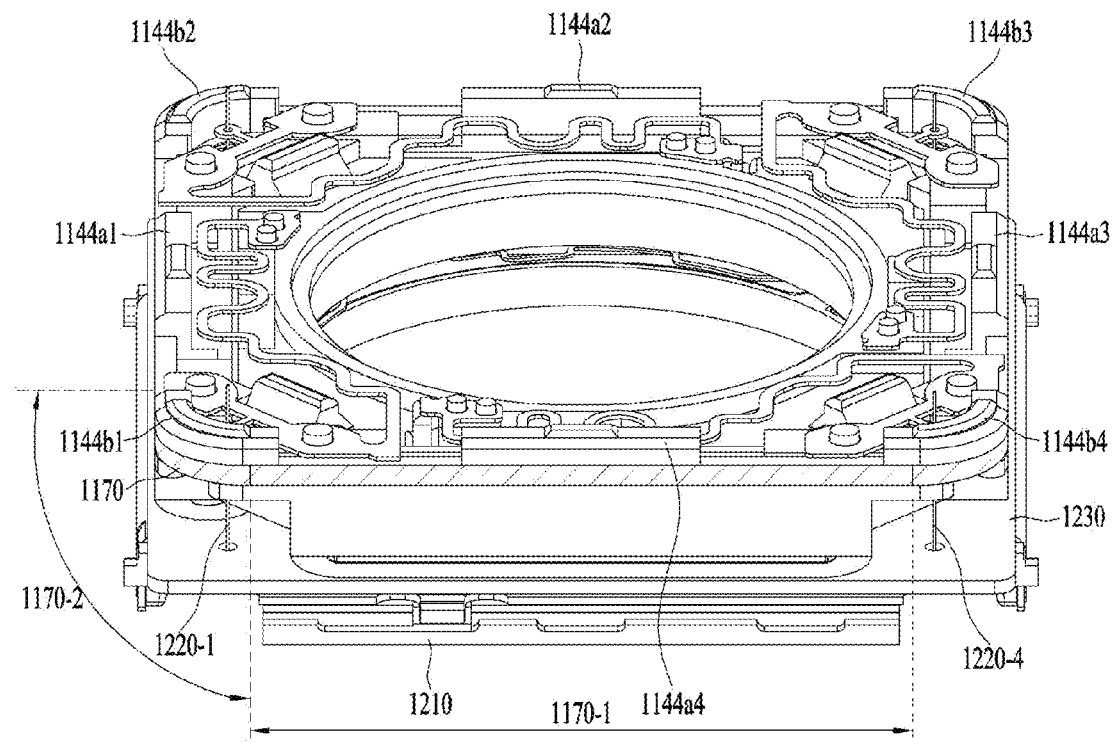
FIG. 18 is a perspective side view of the lens driving device shown in FIG. 12.
Figure 19A:
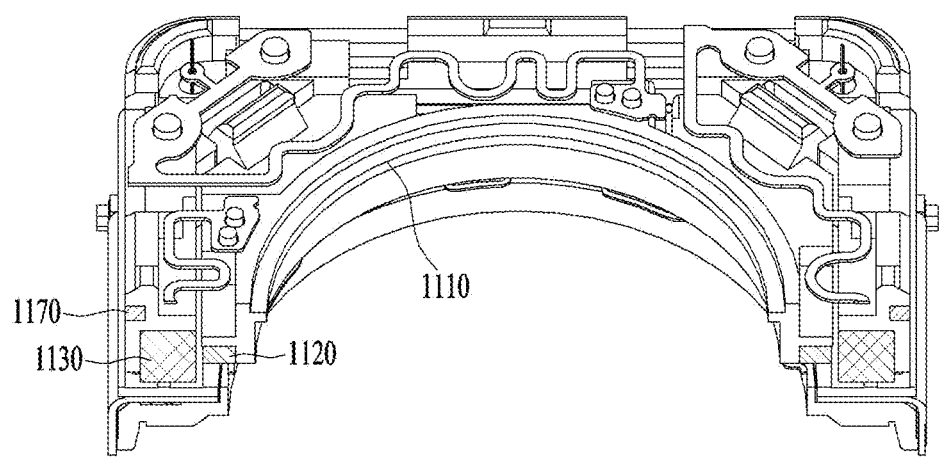
FIG. 19A is a cross-sectional view of the lens driving device shown in FIG. 12, taken along line I-I'.
Figure 19B:
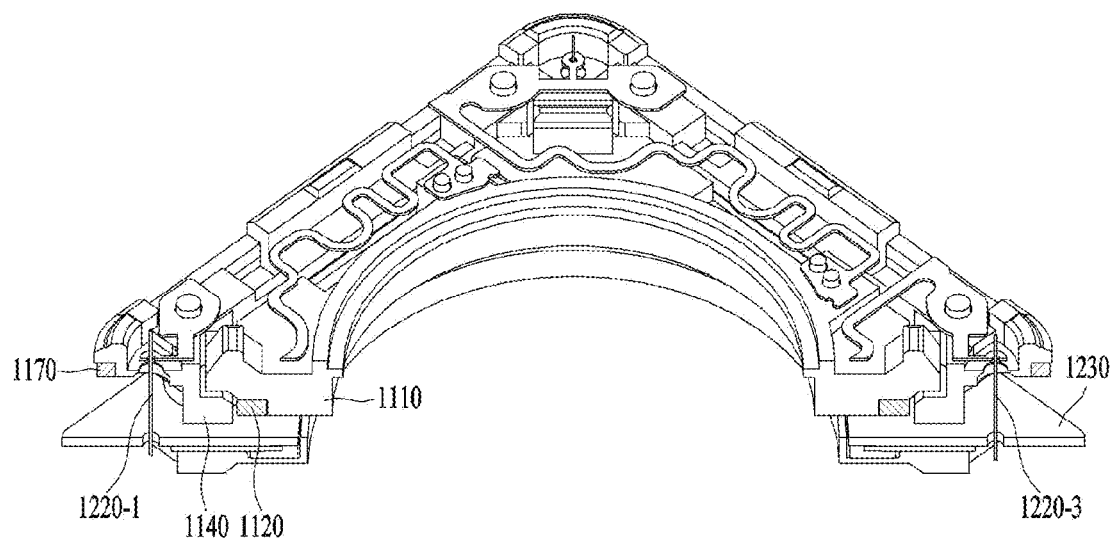
FIG. 19B is a cross-sectional view of the lens driving device shown in FIG. 12, taken along line II-II'.

FIG. 18 is a perspective side view of the lens driving device shown in FIG. 12, FIG. 19A is a cross-sectional view of the lens driving device shown in FIG. 12, taken along line I-I', and FIG. 19B is a cross-sectional view of the lens driving device shown in FIG. 12, taken along line II-II'.

With reference to FIGS. 18, 19A and 19B, the sensing coil 170 is directly wound on the sensing coil receiving grooves 1141b provided on the first side parts 1141 and the second side parts 1142 of the housing 1140.

At the initial position, the sensing coil 1170 may not overlap the magnets 1130 in a direction vertical to the first direction. The reason for this is to reduce interference between the magnets 1130 and the sensing coil 1170.

Further, at the initial position, the sensing coil 1170 may be spaced apart from the first coil 1120 by a predetermined interval in the first direction, and may not overlap the first coil 1120 in a direction vertical to the first direction. Maintenance of the predetermined interval between the first coil and the sensing coil 1170 in the first direction serves to secure linearity in induced voltage induced in the sensing coil 1170 by current of the first coil 1120.

At the initial position, the sensing coil 1170 may overlap the magnets 1130 in the first direction, without being limited thereto, and, in accordance with another embodiment, they may not overlap each other in the first direction.

The sensing coil 1170 may be directly wound on the side portion of the housing 1140 so that at least a part of the sensing coil 1170 may be located at the outside of the support members 1220. For example, the outside of the support members 1220 may be opposite the center of the hollow of the housing 140 with respect to the support members 1220.

The support members 1220 may be located between the first coil 1120 and the sensing coil 1170 in a direction vertical to the optical axis.

The sensing coil 1170 may include first parts 1170-1 (with reference to FIG. 18) disposed on the outer surfaces of the first side parts 1141, and second parts 1170-2 (with reference to FIG. 18) disposed on the outer surfaces of the second side parts 1142.

For example, each of the first parts 1170-1 of the sensing coil 1170 may have a straight shape, and each of the second parts 1170-2 may have a curved shape.

The second parts 1170-2 of the sensing coil 1170 may be located at the outside of the support members 1220. For example, each of the second parts 1170-2 of the sensing coil 1170 may be located at the outside of the corresponding one of the support members 1220-1 to 1220-4.

A distance from the center of the housing 1140 to each of the support members 1220-1 to 1220-4 is less than a distance from the center of the housing 1140 to each of the second parts 1170-2 of the sensing coil 1170. For example, a distance from the center of the housing 1140 to one support member (for example, the support member 1220-1) may be less than a distance from the center of the housing 1140 to the second part 1170-2 of the sensing coil 1170 corresponding to the support member (for example, the support member 1220-1).

The sensing coil 1170 does not overlap the frame connection part 1153 of each of the first to fourth upper elastic members 1150-1 to 1150-4 in the first direction.

Figure 20A:
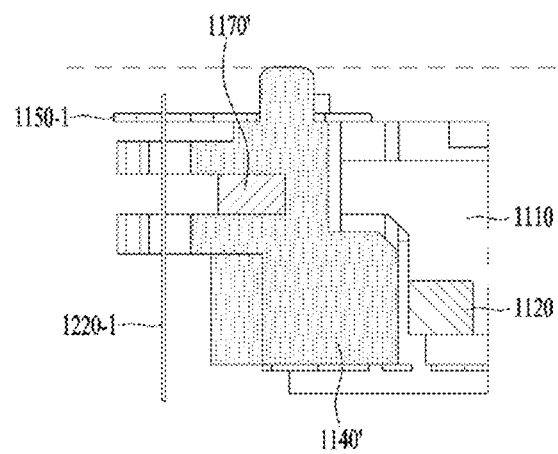
FIGS. 20A and 20B illustrate partial cross-sectional views taken along line II-II', describing relative positions of a sensing coil and support members in accordance with one embodiment.
Figure 20B:
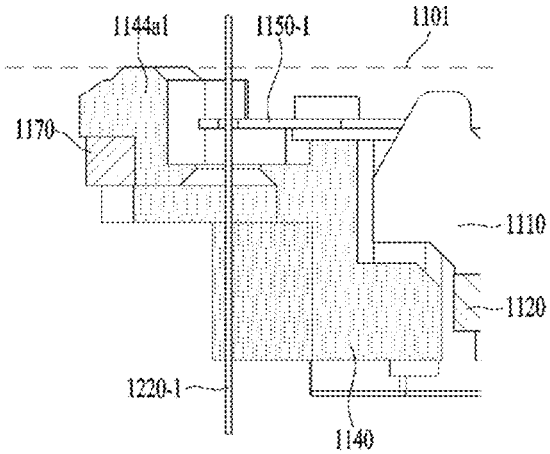
Figure 21A:
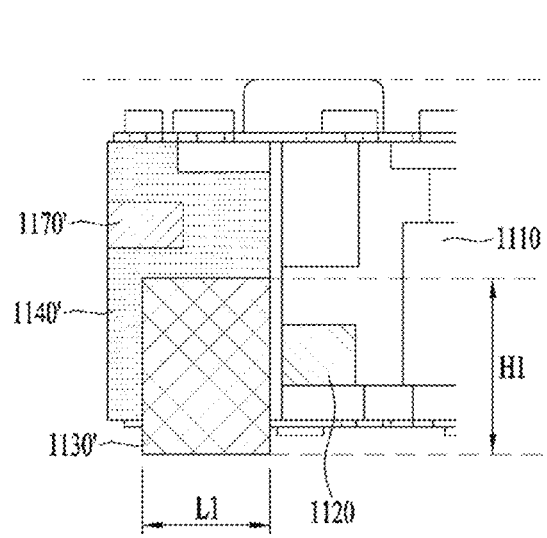
FIGS. 21A and 21B illustrate partial cross-sectional views taken along line I-I', describing relative positions of the sensing coil and the support members in accordance with the embodiment.
Figure 21B:
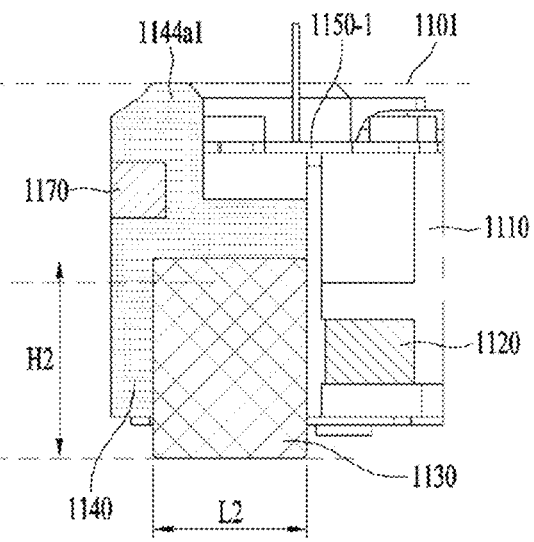

FIGS. 20A and 20B illustrate partial cross-sectional views taken along line II-II', describing relative positions of the sensing coil 1170 and the support members 1220 in accordance with one embodiment, and FIGS. 21A and 21B illustrate partial cross-sectional views taken along line I-I', describing the relative positions of the sensing coil 1170 and the support members 1220 in accordance with the embodiment.

FIGS. 20A and 21A are partial cross-sectional views of a lens driving device having a sensing coil 1170 disposed at the inside of support members 220-1, and FIGS. 20B and 21B are partial cross-sectional views of a lens driving device in accordance with one embodiment. It is assumed that the upper end of a housing 1140 of FIGS. 20A and 21A and the upper end of a housing 1140 of FIGS. 20B and 21B are aligned with the same reference line 1101.

With reference to FIGS. 20A, 20B, 21A, and 21B, in the embodiment, the sensing coil 1170 is directly wound on the side portion of the housing 1140 so that the second parts 1170-2 of the sensing coil 1170 are located at the outside of the support members 1220-1 to 1220-4) and, thus, the sensing coil 1170 may be wound on the upper ends of the outer surfaces of the first and second side parts 1141 and 1142 of the housing 1140 and the length of the sensing coil 1170, which is wound on the housing 1140 at one time, may be increased. As the length of the sensing coil 1170 wound on the housing 1140 at one time is increased, the number of windings of the sensing coil 1170 on the housing 1140 to implement the sensing coil 170 having a predetermined resistance value may be reduced. Further, as the number of windings of the sensing coil 1170 is reduced, a region of the housing 1140 occupied by the sensing coil 1170 may be decreased, a region of the housing 1140 in which the magnets 1130 are disposed may be increased and, thus, the size of magnets which may be mounted on the housing 1140 may be increased.

For example, the resistance value of the sensing coil may be influenced by temperature change, and sensing current may be changed by change in the resistance value of the sensing coil. Such sensing current change due to temperature change may cause malfunction in implementation of the AF function and thus temperature compensation is required. Such temperature compensation may be easily performed by raising the resistance of the sensing coil to a predetermined resistance value (for example, 30Ω) or more. In the embodiment, a predetermined resistance value of the sensing coil to facilitate temperature compensation may be implemented by a small number of windings of the sensing coil.

Consequently, in the embodiment, by securing a space of the housing 1140 in which the magnets 1130 having a greater size may be disposed, electromagnetic force by interaction with the magnets 1130 may be increased.

Magnets 1130 having a first width L1 and a first height H1 may be disposed on the housing 1140 provided with the sensing coil 1170 shown in FIG. 21A and, on the other hand, magnets 1130 having a second width L2 (L2>L1) and a second height H2 (H2>H1) may be disposed on the housing 1140 provided with the sensing coil 1170 shown in FIG. 21B.

Figure 22:
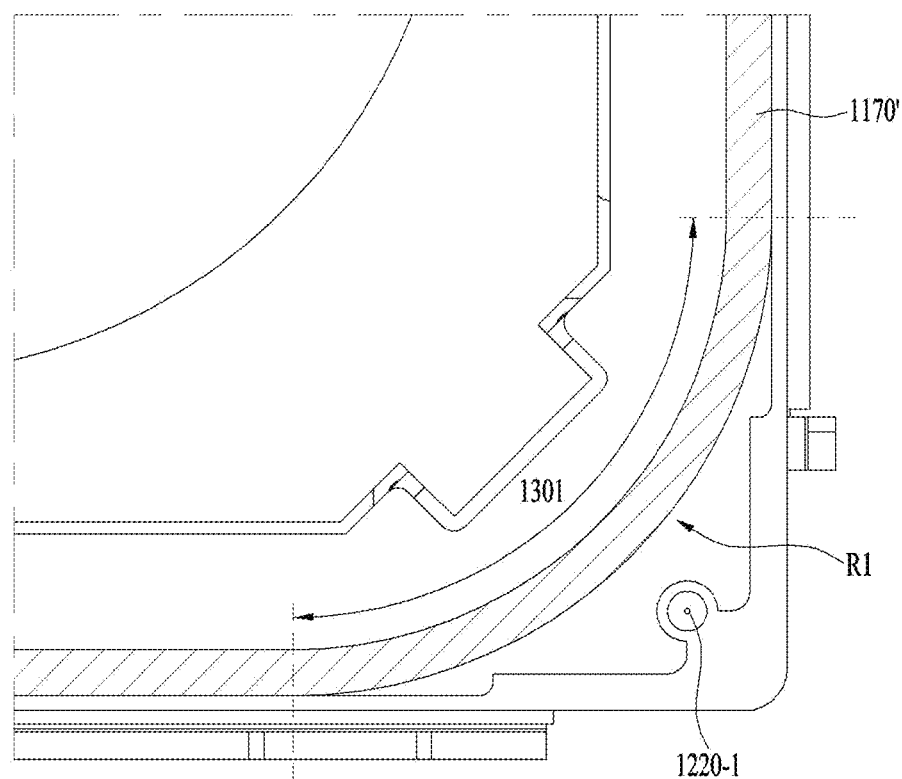
FIG. 22 is a top view illustrating disposition of the sensing coil shown in FIG. 20A.
Figure 23:
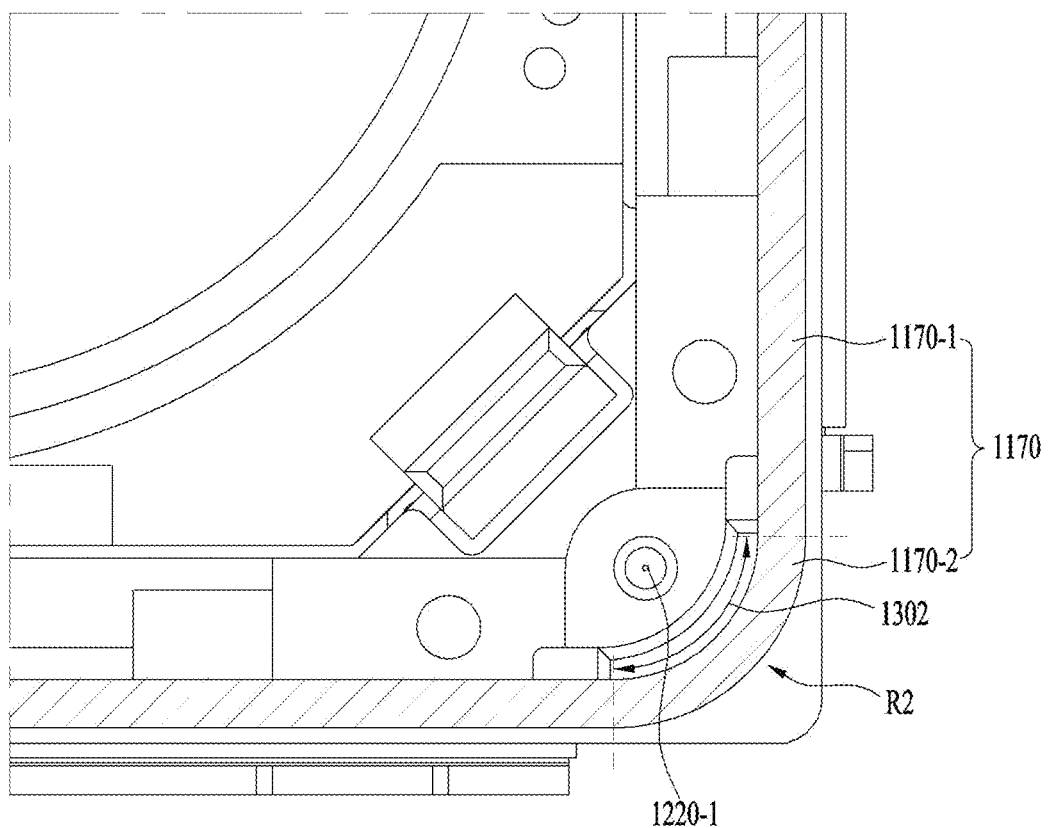
FIG. 23 is a top view illustrating disposition of the sensing coil shown in FIG. 20B.

FIG. 22 is a top view illustrating disposition of the sensing coil 1170 shown in FIG. 20A, and FIG. 23 is a top view illustrating disposition of the sensing coil 1170 shown in FIG. 20B.

With reference to FIGS. 22 and 23, a curvature R2 of a curved part 1302 of the sensing coil 1170 in accordance with the embodiment is less than a curvature R1 of a curved part 1301 of the sensing coil 1170 and, thus, the length of the former sensing coil 1170 which is wound at one time is greater than the length of the latter sensing coil 1170 which is wound at one time.

As described above, in accordance with the embodiment, the sensing coil 1170 is directly wound on the outer surfaces of the first and second side parts 1141 and 1142 of the housing 1140 and, thus, lowering of reliability in bonding between the sensing coil 1170 and the housing 1140 or between the sensing coil 1170 and the upper elastic member 1150 may be inhibited.

Further, since the sensing coil 1170 is disposed below the upper elastic member 150 so as to be spaced apart from the upper elastic member 150, there is no spatial limit in installing the upper elastic member 150 at the upper end of the housing 1140 in accordance with the embodiment.

Further, since the sensing coil 1170 is disposed at the outside of the support members 1220, the outermost circumferential length of the sensing coil 1170 may be increased, the sensing coil 1170 may implement a predetermined resistance at a small number of windings, and the size of the magnets 1130 which may be disposed on the housing 1140 and thus electromagnetic force for the AF or OIS function may be increased.

Figure 24A:
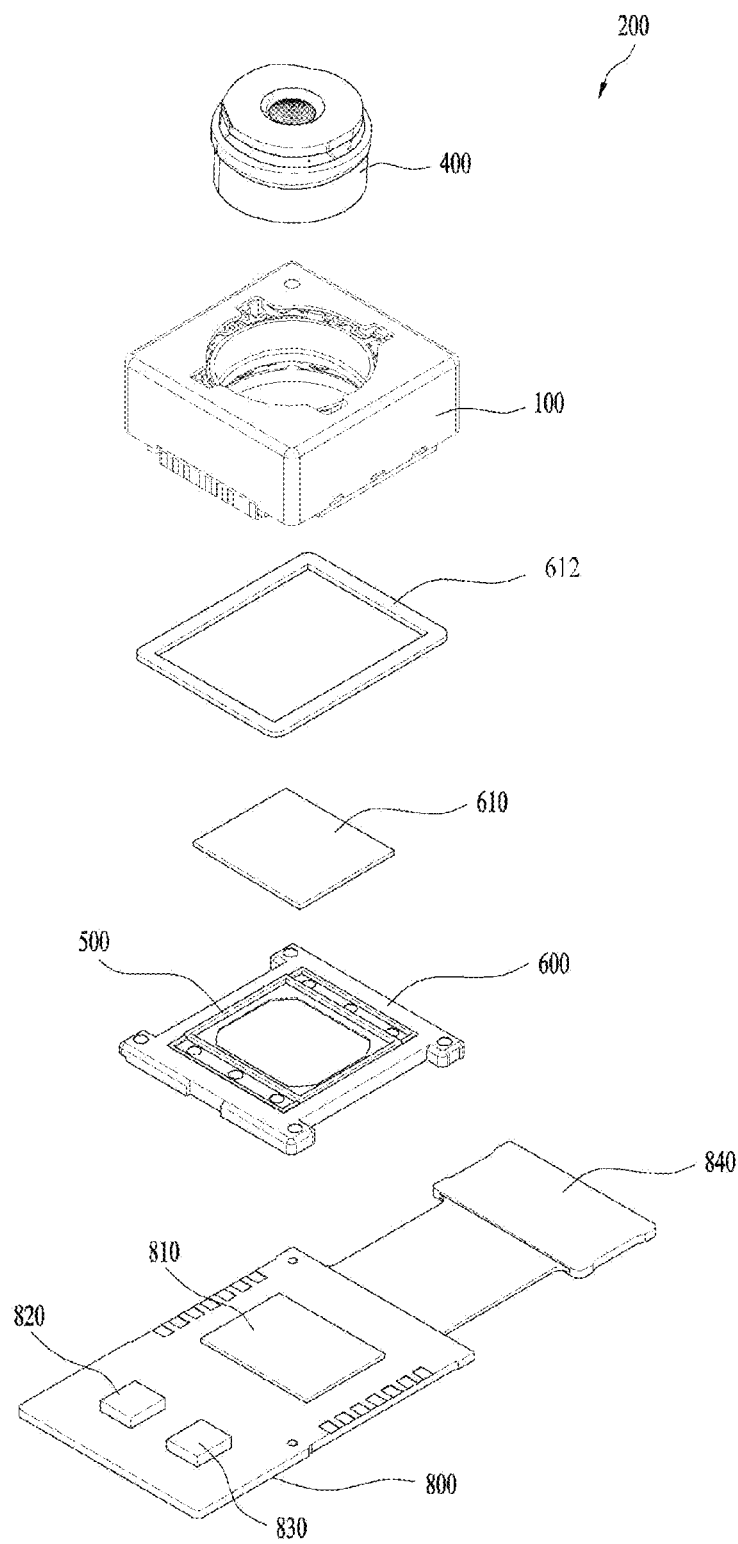
FIG. 24A is an exploded perspective view of a camera module in accordance with one embodiment.

FIG. 24A is an exploded perspective view of a camera module 200 in accordance with one embodiment.

With reference to FIG. 24A, the camera module may include a lens barrel 400, a lens driving device 100, an adhesive member 612, a filter 610, a first holder 600, a second holder 800, an image sensor 810, a motion sensor 820, a controller 830 and a connector 840. The camera module may include the lens driving device 1100 of FIG. 11 instead of the lens driving device 100.

The lens barrel 400 may be mounted on a bobbin 110 of the lens driving device 100.

The first holder 600 may be disposed below a base 210 of the lens driving device 100. The filter 610 may be installed on the first holder 600, and the first holder 600 may have a protrusion 500 on which the filter 610 is received.

The adhesive member 612 may couple or adhere the base 210 or 1210 of the lens driving device 100 or 1100 to the first holder 600. The adhesive member 612 may serve to inhibit foreign substances from being introduced into the lens driving device 100, in addition to serving as an adhesive, as described above.

For example, the adhesive member 610 may be epoxy, a thermohardening adhesive, or a UV hardening adhesive.

The filter 610 may serve to inhibit rays of a specific frequency band out of light passing through the lens barrel 400 from being incident upon the image sensor 810. The filter 610 may be an infrared-ray cut filter, but is not limited thereto. Here, the filter 610 may be disposed parallel to the x-y plane.

A hollow may be formed at a region of the first holder 600, at which the filter 610 is mounted, so that light passing through the filter 610 may be incident upon the image sensor 810.

The second holder 800 may be disposed below the first holder 600, and the image sensor 810 may be mounted on the second holder 800. The image sensor 810 is a region upon which light having passed through the filter 610 is incident so as to form an image.

The second holder 800 may have various circuits, devices, a controller, etc. so as to convert the image formed on the image sensor 810 into an electrical signal and then to transmit the electrical signal to an external apparatus.

The second holder 800 may be implemented as a circuit board on which the image sensor may be mounted and a circuit pattern may be formed, and to which various elements are coupled.

The image sensor 810 may receive an image included in light incident through the lens driving device 100, and convert the received image into an electrical signal.

The filter 610 and the image sensor 810 may be spaced apart from each other so as to be opposite to each other in the first direction.

The motion sensor 820 may be mounted on the second holder 800 and be conductively connected to the controller 830 through the circuit pattern provided on the second holder 800.

The motion sensor 820 outputs information regarding angular velocity of rotation of camera module 200 due to movement of the camera module 200. The motion sensor 820 may be implemented as a 2-axis or 3-axis gyro sensor or an angular velocity sensor.

The controller 320 may be mounted on the second holder 800 and be conductively connected to second position sensors 240 and the second coil 230 of the lens driving device 100. For example, the second holder 800 may be conductively connected to a circuit board 250 of the lens driving device 100, and the controller 820 mounted on the second holder 800 may be conductively connected to the second position sensors 240 and the second coil 230 through the circuit board 250.

The controller 830 may output a driving signal to perform handshake correction of the OIS movable unit of the lens driving device 100, based on feedback signals provided from the second position sensors 240 of the lens driving device 100.

The connector 840 may be conductively connected to the second holder 800 and have ports to be conductively connected to external apparatuses.

Further, the lens driving device 100 in accordance with the embodiment may be applied to optical devices which form an image of an object located in a space using characteristics of light, i.e., reflection, refraction, absorption, coherence, diffraction, etc., and aim at increasing eyesight, recording and reproducing an image using lenses, or performing optical measurement or dissemination and transmission of an image. For example, the optical devices in accordance with the embodiment may be a smartphone, a mobile terminal provided with a camera, etc.

Figure 24B:
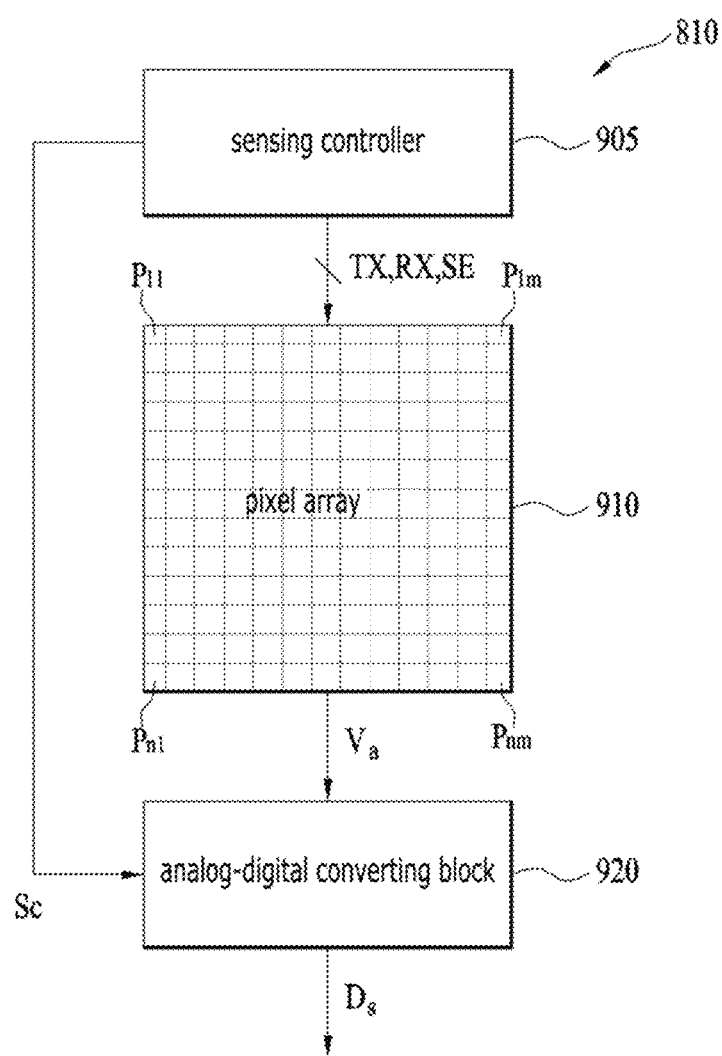
FIG. 24B is a block diagram illustrating one embodiment of an image sensor shown in FIG. 24A.

FIG. 24B is a block diagram illustrating one embodiment of the image sensor 810 shown in FIG. 24A.

With reference to FIG. 24B, the image sensor 810 includes a sensing controller 905, a pixel array 910, and an analog-digital converting block 920.

The sensing controller 905 outputs control signals to control transistors included in the pixel array 120 (for example, a reset signal RX, a transfer signal TX and a selection signal SX) and control signals Sc to control the analog-digital conversion block 130.

The pixel array 910 may include a plurality of unit pixels $P_{11}$ to $P_{nm}$ (n,m>1), and the unit pixels $P_{11}$ to $P_{nm}$ may be arranged in a matrix consisting of rows and columns. Each of the unit pixels $P_{11}$ to $P_{nm}$ may be a photoelectric conversion element which senses light and converts the sensed light into an electrical signal.

The pixel array 120 may include sensing lines connected to output terminals of the unit pixels $P_{11}$ to $P_{nm}$.

For example, each of the unit pixels $P_{11}$ to $P_{nm}$ may include a photodiode, a transfer transistor, a reset transistor, a drive transistor and a selection transistor, without being limited thereto. The number of the transistors included in each unit pixel is not limited to four, and may be three or five.

The photodiode may absorb light and generate charges by the absorbed light.

The transfer transistor may transfer the charges generated by the photodiode to a sensing node (for example, a floating diffusion region) in response to a transfer signal TX. The reset transistor may reset the unit pixel in response to a reset signal RX. The drive transistor may be controlled in response to voltage of the sensing node, be implemented as a source follower and serve as a buffer. The selection transistor may be controlled by a selection signal SE and output a sensing signal Va to the output terminal of the unit pixel.

The analog-digital converting block 920 samples sensing signals Va corresponding to analog signals output from the pixel array 905, and converts the sampled sensing signals into digital signals Ds. The analog-digital converting block 920 may perform Correlated Double Sampling (CDS) so as to reduce unique fixed pattern noise of the pixels.

The above-described sensing controller 905 and analog-digital converting block 920 may be implemented separately from the controller 830, without being limited thereto, and the sensing controller 905, the analog-digital converting block 920 and the controller 830 may be implemented as one control unit.

Figure 25:
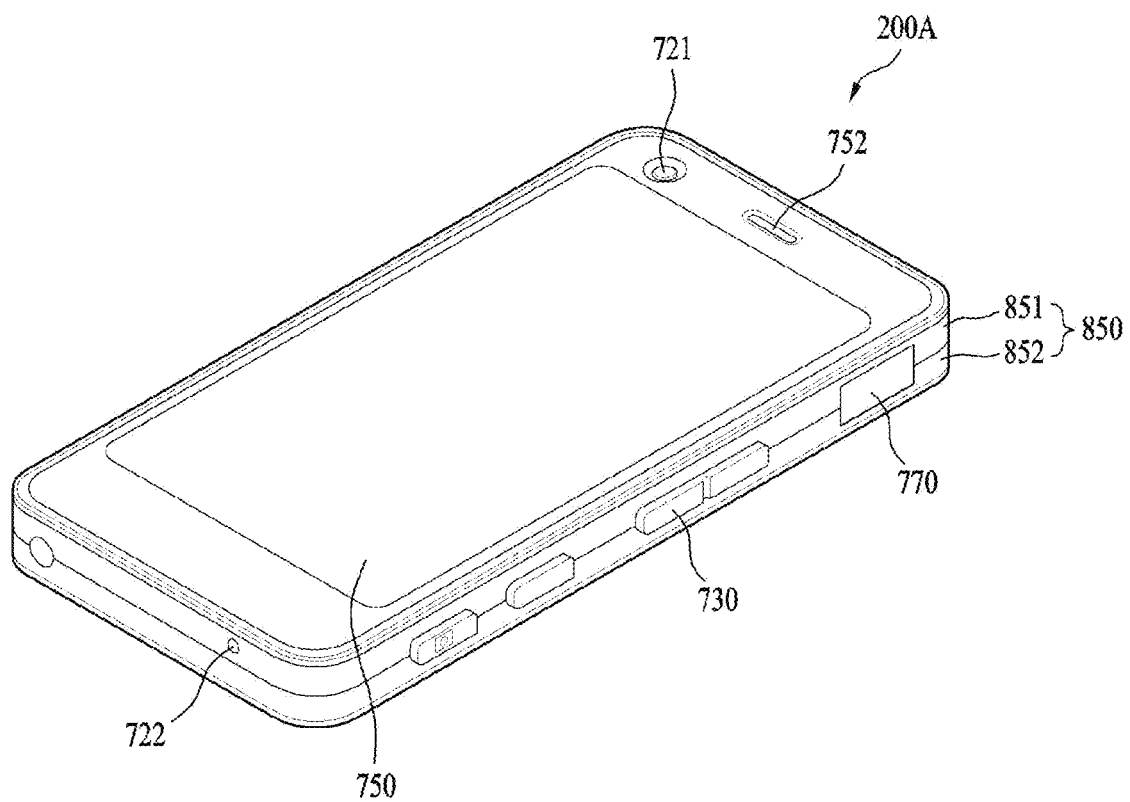
FIG. 25 is a perspective view of a mobile terminal in accordance with one embodiment.
Figure 26:
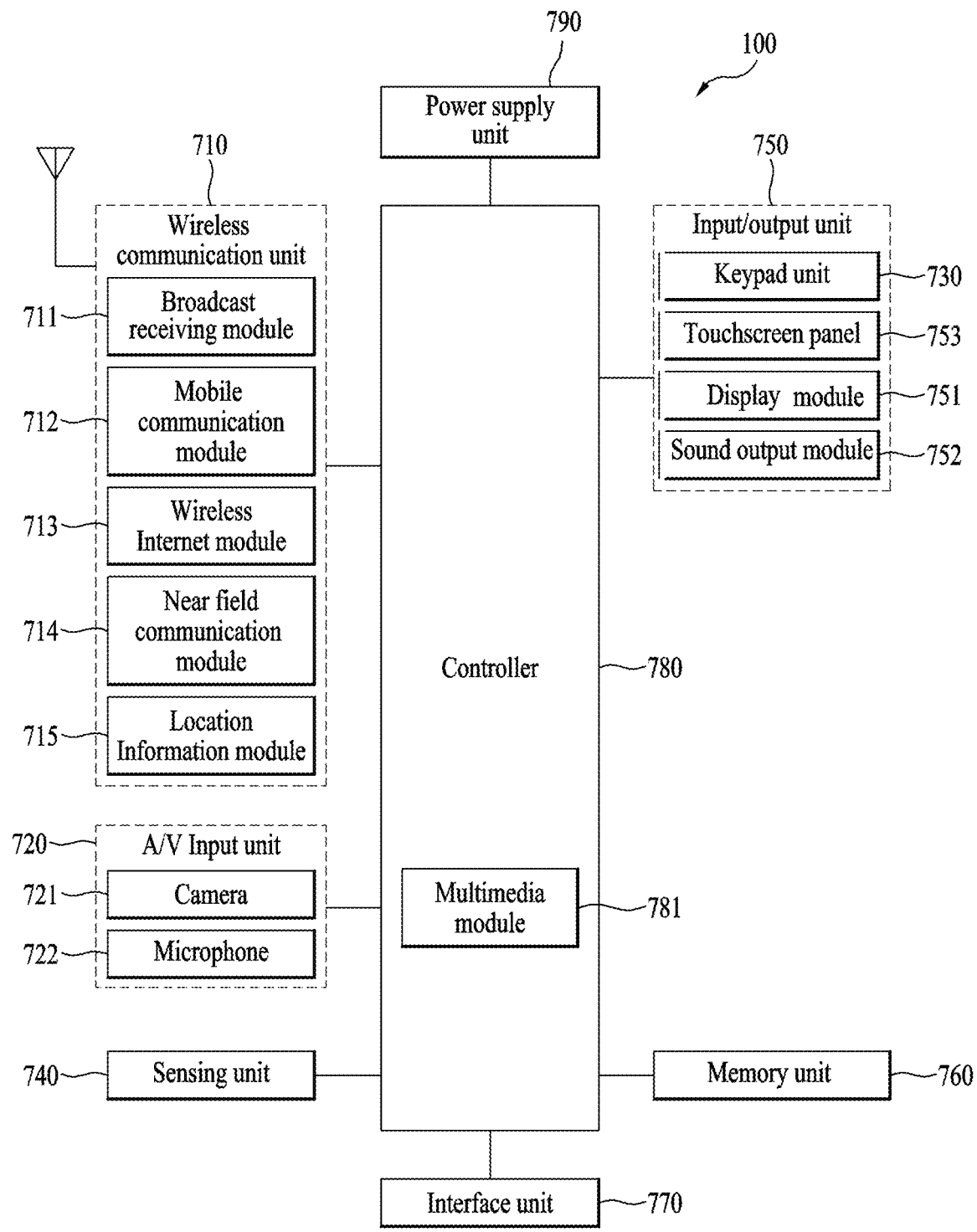
FIG. 26 is a schematic view illustrating the configuration of the mobile terminal shown in FIG. 25.

FIG. 25 is a perspective view of a mobile terminal 200A in accordance with one embodiment, and FIG. 26 is a schematic view illustrating the configuration of the mobile terminal 200A shown in FIG. 25.

With reference to FIGS. 25 and 26, the mobile terminal (hereinafter, referred to as a "terminal") 200A may include a body 850, a wireless communication unit 710, an A/V input unit 720, a sensing unit 740, an input/output unit 750, a memory unit 760, an interface unit 770, a controller 780 and a power supply unit 790.

The body 850 shown in FIG. 25 is a bar type, without being limited thereto, and the body 850 may have various structures, such as a slide type, a folder type, a swing type, a swivel type, etc., in which two or more sub-bodies are coupled so as to be movable relative to each other.

The body 850 may include a case (a casing, a housing, a cover, etc.) forming the external appearance thereof. For example, the body 850 may be divided into a front case 851 and a rear case 852. Various electronic components of the terminal may be installed in a space between the front case 851 and the rear case 852.

The wireless communication unit 710 may include one or more modules performing wireless communication between the terminal 200A and a wireless communication system or between the terminal 200A and a network to which the terminal 200A is connected. For example, the wireless communication unit 710 may include a broadcast receiving module 711, a mobile communication module 712, a wireless Internet module 713, a near field communication module 714 and a location information module 715.

The Audio/Video (A/V) input unit 720 may serve to input an audio signal or a video signal, and include a camera 721 and a microphone 722.

The camera 721 may be the camera 200 in accordance with the embodiment shown in FIGS. 24A and 24B.

The sensing unit 740 may sense the current state of the terminal 200A, such as an opening/closing state of the terminal 200A, a position of the terminal 200A, whether or not a user contacts the terminal 200A, a direction of the terminal 200A and acceleration/deceleration of the terminal 200A, and generate a sensing signal to control operation of the terminal 200A. For example, if the terminal 200A is a slide type, the opening/closing state of the slide-type terminal may be sensed. Further, the sensing unit 740 may perform a sensing function regarding whether or not power is supplied to the power supply unit 790, whether or not an external apparatus is coupled to the interface unit 770, etc.

The input/output unit 750 serves to generate visible, audible or tactile input or output. The input/output unit 750 may generate input data to control operation of the terminal 200A and display information processed by the terminal 200A.

The input/output unit 750 may include a keypad unit 730, a display module 751, a sound output module 752 and a touchscreen panel 753. The keypad unit 730 may generate input data by keypad input.

The display module 751 may include a plurality of pixels, colors of which are changed according to an electrical signal. For example, the display module 751 may include at least one of a liquid crystal display, a thin film transistor-liquid crystal display, an organic light-emitting diode display, a flexible display or a 3D display.

The sound output module 752 may output audio data received from the wireless communication unit 710 in call signal reception, a call mode, a recording mode, a voice recognition mode or a broadcast reception mode, or output audio data stored in the memory unit 760.

The touchscreen panel 753 may convert change in capacitance generated due to user's touch of a specific region of a touchscreen, into an electrical input signal.

The memory unit 760 may store programs for processing and control of the controller 780, and temporarily store data which is input/output (for example, phone book data, messages, audio data, still images, photographs, moving pictures, etc.). For example, the memory unit 760 may store an image photographed by the camera 721, for example, a photograph or a moving picture.

The interface unit 770 serves as a channel connected to an external apparatus connected to the terminal 200A. The interface unit 770 may receive data transmitted from the external apparatus, may receive power and then transmit power to respective components of the terminal 200A, or may transmit data in the terminal 200A to the external apparatus. For example, the interface unit 770 may include wired/wireless headset ports, an external charger port, wired/wireless data ports, a memory card port, a port connected to a device provided with an identification module, an audio Input/Output (I/O) port, a video Input/Output (I/O) port, an earphone port, etc.

The controller 780 may control the overall operation of the terminal 200A. For example, the controller 780 may perform control and processing regarding voice call, data communication, video call, etc.

The controller 780 may have a multimedia module 781 to reproduce multimedia. The multimedia module 781 may be implemented inside the controller 180, or be implemented separately from the controller 780.

The controller 780 may process pattern recognition in which handwriting input or drawing input performed on the touchscreen may be recognized as characters or an image.

The power supply unit 790 may receive external power or internal power and then supply necessary power to the respective components under control of the controller 780.

Although embodiments have been described with reference to a number of illustrative embodiments thereof, it should be understood that numerous other modifications and embodiments can be devised by those skilled in the art that will fall within the spirit and scope of the principles of the disclosure. More particularly, various variations and modifications are possible in the component parts and/or arrangements of the subject combination arrangement within the scope of the disclosure, the drawings and the appended claims. Therefore, it should be understood that differences regarding the modifications and applications are within the spirit and scope of the disclosure which is defined in the appended claims and their equivalents.

INDUSTRIAL APPLICABILITY

Embodiments may be applied to a lens driving device which may inhibit lowering of bonding reliability of a sensing coil, enable easy soldering to bond the sensing coil, implement the sensing coil having a predetermined resistance at a small number of windings and improve electromagnetic force through interaction with magnets, and a camera module and an optical device including the same.

The invention claimed is:

1. A lens driving device comprising:
   a housing;
   a bobbin disposed in the housing;
   a magnet disposed on the housing;
   a first coil disposed on the bobbin and configured to move the bobbin in a first direction by an electromagnetic interaction with the magnet;
   a sensing coil disposed on the housing so as to be spaced apart from the magnet and configured to generate an induced voltage by an interaction with the first coil; and
   a second coil facing the magnet in the first direction in parallel to an optical axis,
   wherein a recess is formed in an outer surface of a side portion of the housing, and the sensing coil is disposed in the recess of the housing.

2. The lens driving device according to claim 1,
   wherein a distance between the first coil and the sensing coil in the first direction is configured to vary as the bobbin moves in the first direction, and
   wherein the induced voltage is generated at the sensing coil based on the distance between the first coil and the sensing coil.

3. The lens driving device according to claim 1, wherein the sensing coil has a ring shape, and the ring shape of the sensing coil is disposed in the recess so as to be rotated about the optical axis.

4. The lens driving device according to claim 1, wherein the sensing coil is disposed above the magnet.

5. The lens driving device according to claim 1, wherein the sensing coil is not overlapped with the magnet in the first direction.

6. The lens driving device according to claim 1, comprising an upper elastic member coupled to an upper portion of the bobbin and an upper portion of the housing.

7. The lens driving device according to claim 6, wherein the sensing coil is disposed below the upper elastic member.

8. The lens driving device according to claim 6, wherein the upper elastic member comprises an inner frame coupled to the upper portion of the bobbin, an outer frame coupled to the upper portion of the housing, and a frame connection part connecting the inner frame and the outer frame,
wherein one end of the sensing coil is directly bonded to the outer frame via a solder.

9. The lens driving device according to claim 6, comprising:
a circuit board disposed below the second coil;
a base disposed below the circuit board; and
a support member coupled to the upper elastic member and electrically connecting the upper elastic member and the circuit board.

10. The lens driving device according to claim 9, wherein the upper elastic member comprises four upper elastic members,
wherein two of the four upper elastic members are electrically connected to the first coil, and another two of the four upper elastic members are electrically connected to the sensing coil,
wherein the support member comprises four support members corresponding to the four upper elastic members, and
wherein each of the four supporting members electrically connects a corresponding one of the four upper elastic members and the circuit board.

11. The lens driving device according to claim 1, wherein the second coil is configured to move the housing in a direction perpendicular to the first direction by an interaction with the magnet.

12. The lens driving device according to claim 1, wherein the housing comprises a sensing coil guide part formed at an outer surface of the side portion thereof for receiving one end part of the sensing coil.

13. The lens driving device according to claim 12, wherein the sensing coil guide part is formed as a protrusion protruding from the outer surface of the side portion of the housing.

14. The lens driving device according to claim 12, wherein the sensing coil guide part is formed as a recess formed at the outer surface of the side portion of the housing.

15. The lens driving device according to claim 1, wherein the second coil comprises a circuit member disposed on the circuit board and coils formed in the circuit member.

16. The lens driving device according to claim 1, comprising a position sensor disposed on the base and configured to sense a movement of the housing.

17. A camera module comprising:
the lens driving device according to claim 1;
a lens barrel coupled to the lens driving device; and
an image sensor.

18. A lens driving device comprising:
a housing;
a bobbin disposed in the housing;
a magnet disposed on the housing;
a first coil disposed on the bobbin and configured to move the bobbin in a first direction by an electromagnetic interaction with the magnet;
an upper elastic member comprising an inner frame coupled to an upper portion of the bobbin, an outer frame coupled to an upper portion of the housing, and a frame connection part connecting the inner frame and the outer frame;
a sensing coil disposed on a side portion of the housing so as to be spaced apart from the magnet and configured to generate an induced voltage by an interaction with the first coil; and
a second coil facing the magnet in the first direction in parallel to an optical axis,
wherein the housing comprises a sensing coil guide part for receiving one end part of the sensing coil, and
wherein the one end part of the sensing coil is coupled to the outer frame of the upper elastic member by a solder.

19. The lens driving device according to claim 18, wherein the sensing coil guide part is a groove provided on the side portion of the housing.

20. The lens driving device according to claim 18, wherein the housing comprises a stepped part protruding from an outer surface of the side portion thereof,
wherein the sensing coil guide part is protruded from the outer surface of the side portion of the housing, and
wherein a groove is formed between the sensing coil guide part and the stepped part for receiving the one end part of the sensing coil.

* * * * *